United States Patent
Shanbhogue et al.

(10) Patent No.: US 11,099,847 B2
(45) Date of Patent: Aug. 24, 2021

(54) MODE-SPECIFIC ENDBRANCH FOR CONTROL FLOW TERMINATION

(71) Applicant: Intel Corporation, Santa Clara, CA (US)

(72) Inventors: Vedvyas Shanbhogue, Austin, TX (US); Jason W. Brandt, Austin, TX (US); Ravi L. Sahita, Beaverton, OR (US); Xiaoning Li, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/741,498

(22) Filed: Jan. 13, 2020

(65) Prior Publication Data

US 2020/0225950 A1    Jul. 16, 2020

Related U.S. Application Data

(63) Continuation of application No. 14/998,367, filed on Dec. 23, 2015, now abandoned.

(51) Int. Cl.
*G06F 21/00* (2013.01)
*G06F 9/30* (2018.01)
(Continued)

(52) U.S. Cl.
CPC ........ *G06F 9/3005* (2013.01); *G06F 9/30054* (2013.01); *G06F 9/30145* (2013.01);
(Continued)

(58) Field of Classification Search
CPC .................................................... G06F 9/3005
See application file for complete search history.

(56) References Cited

U.S. PATENT DOCUMENTS 5,479,616 A * 12/1995 Garibay, Jr. .......... G06F 9/3802
                                                         712/212
5,825,055 A    10/1998 Summerfelt
(Continued)

FOREIGN PATENT DOCUMENTS

| CN | 1711526 A | 12/2005 |
| EP | 2867843 A1 | 5/2015 |
| WO | 2014/005067 A1 | 3/2014 |

OTHER PUBLICATIONS

Zovi, "Practical Return Oriented Programming," 68 pages, Apr. 2010.
(Continued)

*Primary Examiner* — Hyun Nam
(74) *Attorney, Agent, or Firm* — Nicholson De Vos Webster & Elliott LLP

(57) ABSTRACT

A processor includes an execution unit and a processing logic operatively coupled to the execution unit, the processing logic to: enter a first execution state and transition to a second execution state responsive to executing a control transfer instruction. Responsive to executing a target instruction of the control transfer instruction, the processing logic further transitions to the first execution state responsive to the target instruction being a control transfer termination instruction of a mode identical to a mode of the processing logic following the execution of the control transfer instruction; and raises an execution exception responsive to the target instruction being a control transfer termination instruction of a mode different than the mode of the processing logic following the execution of the control transfer instruction.

12 Claims, 17 Drawing Sheets

(51) Int. Cl.
*G06F 9/38* (2018.01)
*G06F 21/55* (2013.01)

(52) U.S. Cl.
CPC .......... *G06F 9/3857* (2013.01); *G06F 9/3861* (2013.01); *G06F 9/3865* (2013.01); *G06F 9/3867* (2013.01); *G06F 21/554* (2013.01)

(56) References Cited

U.S. PATENT DOCUMENTS

| | | | |
|---|---|---|---|
| 5,826,055 A | 10/1998 | Wang et al. | |
| 6,178,495 B1* | 1/2001 | Slegel | G06F 9/30145 712/206 |
| 6,996,677 B2 | 2/2006 | Lee et al. | |
| 7,340,589 B2 | 3/2008 | Kudo | |
| 7,581,089 B1 | 8/2009 | White | |
| 8,086,438 B2 | 12/2011 | Nohl et al. | |
| 8,434,073 B1 | 4/2013 | Satish et al. | |
| 8,468,600 B1 | 6/2013 | Kaskel et al. | |
| 8,555,077 B2 | 10/2013 | Davis et al. | |
| 8,688,980 B2 | 4/2014 | Davis et al. | |
| 8,689,350 B2 | 4/2014 | Davis et al. | |
| 8,713,704 B2 | 4/2014 | Davis et al. | |
| 8,813,085 B2 | 8/2014 | Glew et al. | |
| 8,869,241 B2 | 10/2014 | Davis et al. | |
| 8,930,714 B2 | 1/2015 | Glew et al. | |
| 8,943,313 B2 | 1/2015 | Glew et al. | |
| 8,955,111 B2 | 2/2015 | Glew et al. | |
| 9,015,860 B2 | 4/2015 | Davis et al. | |
| 9,083,687 B2 | 7/2015 | Davis et al. | |
| 9,098,608 B2 | 8/2015 | Glew et al. | |
| 9,170,843 B2 | 10/2015 | Glew et al. | |
| 9,298,900 B2 | 3/2016 | Davis et al. | |
| 9,348,985 B2 | 5/2016 | Davis et al. | |
| 9,443,085 B2 | 9/2016 | Glew et al. | |
| 9,703,567 B2 | 7/2017 | Shanbhogue et al. | |
| 2003/0097587 A1 | 5/2003 | Gulick | |
| 2003/0154366 A1* | 8/2003 | Chow | G06F 9/30189 712/229 |
| 2004/0158736 A1 | 8/2004 | Watt et al. | |
| 2006/0059470 A1* | 3/2006 | Kurapati | G06F 11/3636 717/128 |
| 2007/0136565 A1 | 6/2007 | Lambrache et al. | |
| 2009/0077544 A1 | 3/2009 | Wu | |
| 2012/0042154 A1 | 2/2012 | Grisenthwaite | |
| 2012/0167120 A1 | 6/2012 | Hentunen | |
| 2012/0179894 A1 | 7/2012 | Leijten et al. | |
| 2013/0024676 A1 | 1/2013 | Glew et al. | |
| 2013/0024867 A1 | 1/2013 | Glew et al. | |
| 2013/0024939 A1 | 1/2013 | Glew et al. | |
| 2013/0036464 A1 | 2/2013 | Glew et al. | |
| 2013/0081043 A1 | 3/2013 | Glew et al. | |
| 2013/0111190 A1 | 5/2013 | Muff et al. | |
| 2013/0133054 A1 | 5/2013 | Davis et al. | |
| 2013/0151515 A1 | 6/2013 | Davis et al. | |
| 2013/0151617 A1 | 6/2013 | Davis et al. | |
| 2013/0159217 A1 | 6/2013 | Davis et al. | |
| 2013/0159413 A1 | 6/2013 | Davis et al. | |
| 2013/0160087 A1 | 6/2013 | Davis et al. | |
| 2013/0160121 A1 | 6/2013 | Yazdani | |
| 2013/0191887 A1 | 7/2013 | Davis et al. | |
| 2013/0197968 A1 | 8/2013 | Davis et al. | |
| 2014/0095833 A1 | 4/2014 | Gschwind et al. | |
| 2014/0123249 A1 | 5/2014 | Davis et al. | |
| 2014/0156972 A1* | 6/2014 | Shanbhogue | G06F 9/30076 712/205 |
| 2015/0006858 A1 | 1/2015 | Toll et al. | |
| 2015/0020075 A1 | 1/2015 | Glew et al. | |
| 2015/0067409 A1 | 3/2015 | Martz et al. | |
| 2015/0095617 A1* | 4/2015 | Shanbhogue | G06F 9/30054 712/208 |
| 2015/0128262 A1 | 5/2015 | Glew et al. | |
| 2015/0178513 A1 | 6/2015 | Conti et al. | |
| 2015/0278116 A1 | 10/2015 | Caprioli | |
| 2016/0171211 A1 | 6/2016 | Chen et al. | |
| 2019/0205136 A1* | 7/2019 | Hu | G06F 9/30079 |

OTHER PUBLICATIONS

Pappas, Kbouncer, "Efficient and Transparent ROP Mitigation," 8 pages, Apr. 1, 2012.
Shacham, "The Geometry of Innocent Flesh on the Bone: Return-into-libc without Function Calls (on the x86)", in Proceedings of the 14th ACM Conference on Computer and Communications Security, 30 pages, Oct. 2007.
International Search Report and Written Opinion for International Patent Application No. PCT/US2016/063671, 15 pages, dated Mar. 13, 2017.
International Search Report and Written Opinion for International Patent Application No. PCT/US2016/063665, 16 pages, dated Mar. 20, 2017.
Advisory Action Office Action, U.S. Appl. No. 14/998,367, dated Dec. 13, 2019, 5 pages.
Final Office Action, U.S. Appl. No. 14/998,367, dated Jun. 8, 2018, 18 pages.
Final Office Action, U.S. Appl. No. 14/998,367, dated Sep. 11, 2019, 13 pages.
International Preliminary Report on Patentability, PCT App. No. PCT/US2016/063671, dated Jul. 5, 2018, 12 pages.
Non-Final Office Action, U.S. Appl. No. 14/998,367, dated May 2, 2019, 13 pages.
Non-Final Office Action, U.S. Appl. No. 14/998,367, dated Nov. 15, 2017, 19 pages.
Office Action, TW App. No. 105138282, dated Aug. 17, 2020, 19 pages (9 pages of English Translation and 10 pages of Original Document).
Allowance Decision of Examination, TW App. No. 105138282, dated Jan. 13, 2021, 3 pages (1 page of English Translation and 2 pages of Original Document).

* cited by examiner

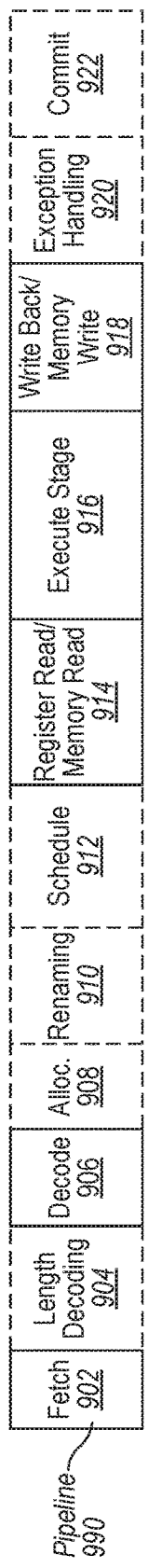
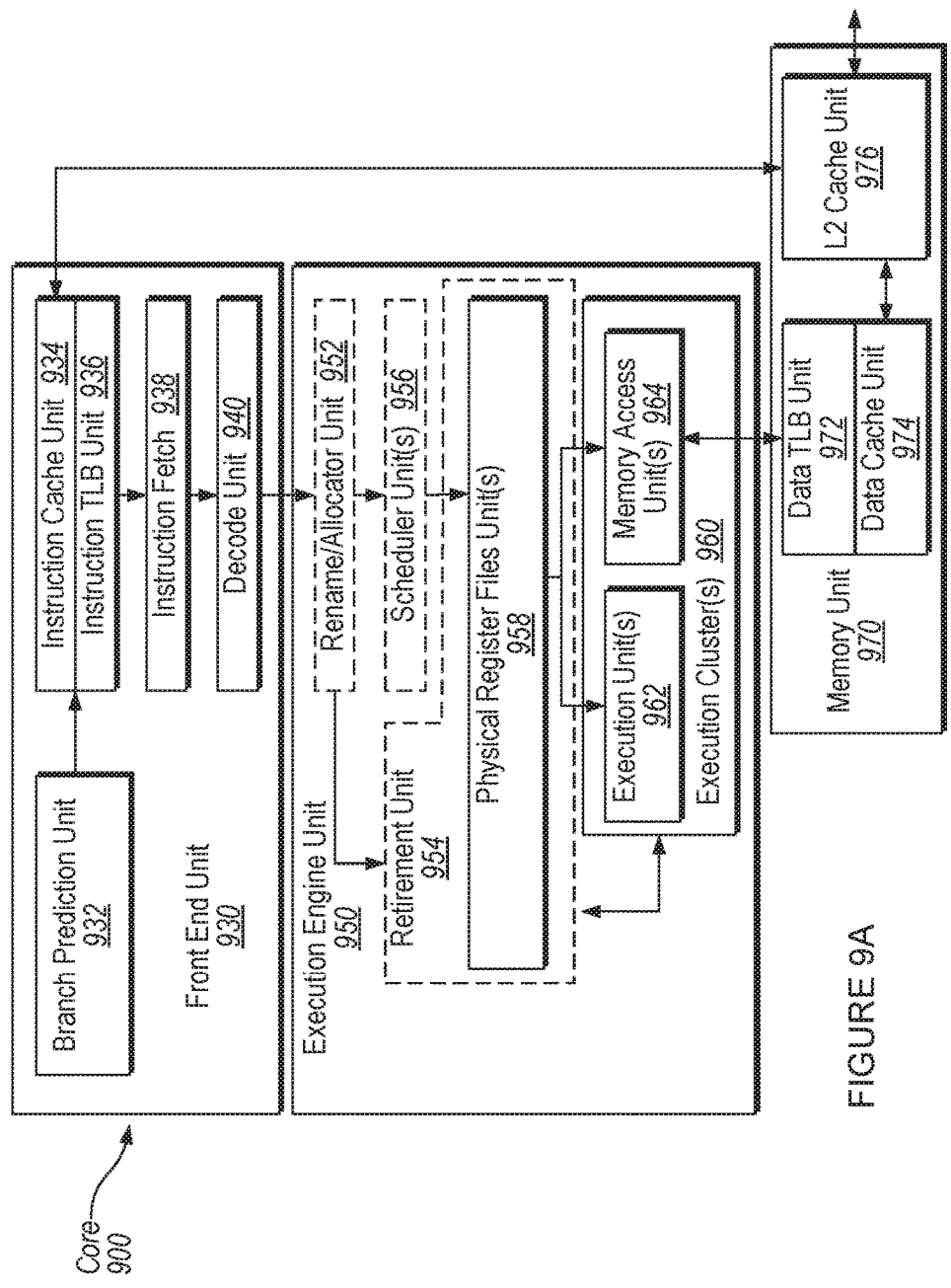
FIGURE 9B
FIGURE 9A

MODE-SPECIFIC ENDBRANCH FOR CONTROL FLOW TERMINATION

RELATED APPLICATIONS

This application is a continuation of U.S. patent application Ser. No. 14/998,367, filed Dec. 23, 2015, which is herein incorporated by reference in its entirety.

BACKGROUND

Return-oriented programming (ROP) is a computer security exploit technique in which an attacker uses software control of a stack to execute an attacker-chosen sequence of machine instructions. These clusters of instructions typically end with a programmer-intended or unintended return (RET) instruction within existing program code. The intended or unintended RET instruction transfers execution to the attacker-chosen return address on the stack and allows the attacker to retain execution control through the program code, and direct execution to the next set of chosen sequence of instructions to achieve the attacker's intent. The clusters of attacker-chosen instruction sequences are referred to as gadgets.

Often the executed gadget includes only several assembler instructions followed by a RET instruction that can already perform a well-defined attack operation. By chaining together a set of these gadgets such that the RET instructions from one gadget lands into the next gadget and so on, the malware writer is able to execute a complex algorithm without injecting any code into the program. Some of these instruction sequences ending in a RET can be found in functions compiled into the program or libraries.

Thus the ROP technique involves delivering a payload having a set of chained list of pointers to gadgets and parameters to a data memory of a program using vulnerabilities like stack buffer overflows. The exploit also overwrites the return address of the vulnerable function that was used to perform the stack buffer overflow to point to the first gadget in the sequence. When this vulnerable function executes a RET instruction, control transfers to the first gadget instead of the function caller. This gadget can then consume one or more data elements from the stack payload. Using this exploit type, the malware writer is able to change the control flow of the program by causing a control transfer to a non-programmer intended location in the program (e.g., to the middle of an instruction).

A ROP attack technique can use various characteristics of an x86 instruction set architecture (ISA): variable length and unaligned instruction encoding: large and dense ISA encoding; a stack holding control and data information; and a single byte opcode RET instruction. Current techniques to defend against such attacks can be ineffective and have various shortcomings.

BRIEF DESCRIPTION OF THE DRAWINGS

FIG. 9A is a block diagram illustrating a micro-architecture for a processor core that can be incorporated into the processor of FIG. 1.

FIG. 9B is a block diagram illustrating an in-order pipeline and a register renaming stage, out-of-order issue/execution pipeline implemented by the processor core of FIG. 9A according to some embodiments of the disclosure.

DESCRIPTION OF EMBODIMENTS

Figure 1:
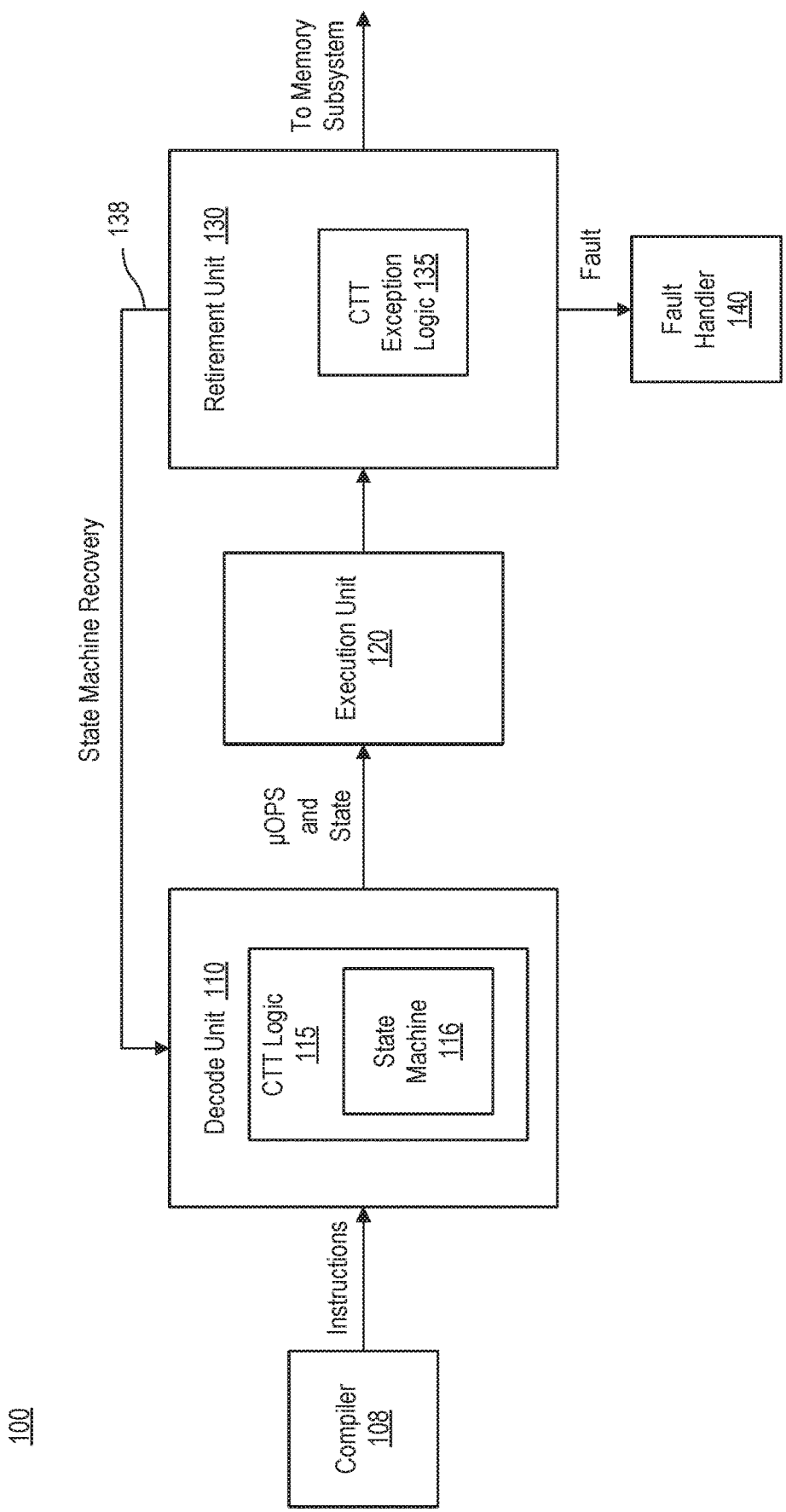
FIG. 1 is a block diagram of a portion of a processor in accordance with an embodiment of the present disclosure.

Embodiments provide a set of instruction set architecture (ISA) instructions that enable a processor to determine whether a control transfer instruction is directed to an appropriate target, and if not to take action to prevent instructions beyond the control transfer instruction from being committed to the architectural state of the processor. In this way, at least certain unintended control transfers within a program can be eliminated, constraining the number of gadgets that a malware writer can use.

More specifically, embodiments provide a set of control transfer termination (CTT) instructions to allow software to specify valid control transfer terminating points in a program such that hardware can enforce control transfers to occur to only programmer-intended locations. These CTT instructions can be opcodes of fixed length that are handled differently than ISA instructions in that the CTT instructions perform no operation other than to signal to the processor that a proper control transfer termination is occurring. In one embodiment, the CTT instructions are mode-specific (e.g., 32-bit or 64-bit), multi-byte opcodes executable as a no operation. Accordingly, CTT instructions perform this enforcement with minimal performance and energy impacts to the program. The CTT ISA extensions can thus mitigate the execution of unintended gadgets in programs.

An indirect call or jump refers to an indirect operand. In one type of indirect call or jump, this indirect operand can be an indirect destination address that provides an address of the instruction to which the call or jump is to be performed. In another type of indirect call or jump, this indirect operand can be a processor register that provides an address of the instruction to which the call or jump is to be performed. In some cases, a compiler need not add (or emit) CTT instructions at control transfer terminating points when the compiler generates indirect jumps and calls (and returns from same) and already has code generated to ensure that the targets of that indirect call or jump (or return) are restricted to a small subset of targets known at compile time. For example, for a lookup or a switch-case statement, the compiler knows the number of possible targets and computes the address of the code for the possible targets. This optimization by the compiler to not emit a CTT instruction at the control transfer terminating points is generally safe when the indirect jump or call is of the type where the indirect operand is a register. If the indirect operand is a memory location, then the contents of those memory locations can be modified between when the compiler checks the contents and when the indirect call or jump instruction uses the content of that memory location to perform the indirect call or jump.

In either of these cases, not requiring a CTT instruction following a control transfer instruction reduces the size of the binary generated by a program (due to eliminated CTT instructions); and, jump or call targets become not-valid targets for indirect jumps or calls from other locations due to lacking the CTT instruction following the control transfer instruction, thus increasing security of the program. In one embodiment, a subcode such as a prefix or suffix can be added to a control transfer instruction (such as an indirect call or jump) indicating that the indirect call or jump need not be tracked by a tracker state machine, which can remain idle for such instructions. As will be further explained, the tracker state machine tracks states for control transfer instructions such that a CTT instruction is required after a control transfer instruction, except where the subcode is detected, to avoid issuing an execution exception.

In an alternative embodiment, the subcode can be added to all control transfer instructions except for those that need not be tracked. In other words, the lack of a subcode can signal to CTT processing logic that those control transfer instructions are not tracked by the tracker state machine, in the alternative embodiment.

In another embodiment, a new indirect control transfer instruction may be defined that need not be tracked.

As more computer systems are used in Internet, text, and multimedia applications, additional processor support has been introduced over time to execute these applications. In one embodiment, an instruction set can be associated with one or more computer architectures, including data types, instructions, register architecture, addressing modes, memory architecture, interrupt and exception handling, and external input and output (I/O). In one embodiment, the ISA can be implemented by one or more micro-architectures, which include processor logic and circuits used to implement one or more instruction sets. Accordingly, processors with different micro-architectures can share at least a portion of a common instruction set.

In one embodiment, an instruction can include one or more instruction formats. Such instruction format can indicate various fields (number of bits, location of bits, etc.) to specify, among other things, the operation to be performed and the operand(s) on which that operation is to be performed. Some instruction formats can be further broken defined by instruction templates (or sub formats). For example, the instruction templates of a given instruction format can be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

A first CTT instruction, referred to herein as an END-BRANCH instruction, is used to identify valid locations in a program to which a control transfer can be validly performed using an indirect CALL or an indirect jump (JMP) instruction. A second CTT instruction, referred to herein as an ENDRET instruction, is used to identify valid locations in a program where a control transfer can be validly performed using a RET instruction.

Within instruction set architecture, a program compiled with 64-bit mode instructions when decoded in 32-bit mode could decode to a different set of instructions than when decoded in 64-bit mode. This attribute has been exploited by malware designed to jump into 32-bit binaries from 64-bit mode and vice versa. For example, consider the following byte string in the program: 4c 8b d1 b8 50 00 00 00 0f 05 c3 0f 1f44 00 00. This byte string, when decoded in 32-bit mode, decodes to following instruction sequence:

| | |
|---|---|
| 4c | dec esp |
| 8b d1 | mov edx, ecx |
| B850000000 | mov eax, 50h |
| 0f 05 | syscall |
| C3 | ret |

However, this same byte string when decoded in 64-bit mode decodes to following instruction sequence:

| | |
|---|---|
| 4c 8b d1 | mov r10, rcx |
| B850000000 | mov eax, 50h |
| 0f 05 | syscall |
| C3 | ret |

Thus, if the above byte string were in a 32-bit binary and then jumps to a 64-bit binary without switching to compatibility mode, the program would lead to execution of an unintended set of instructions. Likewise, if the above byte string were in a 64-bit binary and then jumps to a 32-bit binary without switching to 64-bit mode, the program would lead to execution of an unintended set of instructions. According to an embodiment, therefore, the disclosed processor employs mode-specific opcodes as CTT instructions to block malware attempts to jump to 32-bit programs without switching to compatibility mode or to jump to 64-bit programs before switching to 64-bit mode.

Accordingly, the ENDBRANCH instructions can be further broken into two mode-specific CTT instructions, e.g., ENDBRANCH32 and ENDBRANCH64 instructions, to avoid situations where malware can attempt to jump between processing modes to generate gadgets. Similarly, the ENDRET instruction can be further broken into two mode-specific CTT instructions, namely ENDRET32 and ENDRET64 to prevent similar malware behavior when a control transfer instruction accesses memory to determine an address of a target ENDRET instruction. This extension to different modes can be applied to different modes outside of 32-bit and 64-bit modes as would be apparent to one of ordinary skill.

In an embodiment, these CTT instructions can be 4-byte opcodes chosen such that they are handled differently than ISA instructions when decoded, e.g., the CTT instructions can be defined as no operation (NOP) in the x86 ISA to allow programs compiled with ENDBRANCH/ENDRET instructions to execute on earlier generation processors.

Although the scope of the present disclosure is not limited in this regard in an embodiment, these CTT instructions can have a general form that includes a multi-byte opcode. In one such implementation, these CTT instructions can be represented by a four-byte opcode that corresponds to an opcode value not presently existing in the current x86 ISA. Beyond this opcode, there can be no additional encoding for the instruction, since the instruction executes as a no operation within execution logic. As such, there may be no identification of a source operand, destination operand or immediate value to be associated with the instruction.

FIG. 1 is a block diagram of a portion 100 of a processor in accordance with an embodiment of the present disclosure. As shown in FIG. 1, the portion 100 of the processor includes various portions of a pipelined processor such as an in-order or out-of-order processor. A compiler 108 can compile instructions into machine-readable code also referred to herein as macro-instructions of one or more programs of a given ISA. As seen, instructions from the compiler 108 are provided to a decode unit 110 that decodes the instructions, e.g., into one or more smaller instruction such as micro-operations (pops).

The decode unit 110 can include a CTT logic 115 (also simply referred to herein as processing logic) in accordance with an embodiment of the present disclosure. The CTT logic 115 can analyze incoming instructions and determine whether any given instruction is associated with a control transfer. If so, the CTT logic 115 can determine whether the control transfer instruction includes a specific subcode (such as a pre-defined prefix or suffix opcode) indicating that there is no threat of gadget creation. The CTT logic can associate certain state information with one or more µops. This state information indicates a state of a state machine 116 (implemented by the CTT logic 115) that is modified by decoding of at least certain control transfer and control transfer termination instructions. If instead the instruction is not associated with a control transfer, a different state can be associated with the one or more µops.

When the incoming control transfer instruction lacks the subcode, the CTT logic 115 can transition the state machine 116 from the IDLE state to a given WAIT state. Furthermore, to reflect this WAIT state, a given encoding can be associated with the one or more µops decoded from the incoming control transfer instruction. When a next incoming instruction is a control transfer termination (CTT) instruction that immediately follows the control transfer termination, then state machine 116 can return to the IDLE state and associate a given encoding with the decoded one or more µops. As will be discussed, when a control transfer instruction is not immediately followed by a CTT instruction of the proper mode, the CTT logic 115 can raise an execution exception or insert a fault µop into the processor pipeline (and the state machine can remain in a wait state).

When the incoming control transfer instruction contains the subcode, the CTT logic 115 can place or retain the state machine 116 in an IDLE state. Furthermore, due to the lack of an ENDBRANCH instruction (because of the subcode), there is no CTT instruction to be tracked. Furthermore, when the state machine 116 is in an IDLE state and an incoming instruction does not relate to a control transfer (or termination), an encoding of IDLE state information can be associated with the one or more µops to indicate that state machine 116 remains in the IDLE state.

Accordingly, the decode unit 110 outputs a stream of µops and associated state information to indicate a state of the state machine 116 within the CTT logic 115. These pops and state information can be provided to an execution unit 120, which can include various types of units including arithmetic logic units (ALUs), floating point units and so forth that execute operations indicated by the stream of µops. In an embodiment, the CTT instructions can only control the state transitions in the state machine 200, and in execution logic of the processor, these instructions execute as NOP and do not cause a change in the program semantics.

In turn, results of executing the µops are provided to a retirement unit 130 configured to determine whether given operations were successfully performed and to retire the µops when successfully performed. If a µop is not successfully performed, the retirement unit 130 can raise a fault or exception if an undesired condition occurs as a result of the execution. In an out-of-order processor, the retirement unit 130 can further operate to reorder instructions which can be executed in any order, back into program order. When µops properly retire, the µops can be provided to further portions of a processor such as a memory subsystem.

With further reference to FIG. 1, the retirement unit 130 includes a CTT exception logic 135 that can be configured to determine whether appropriate behavior occurs with regard to control transfer instructions. More specifically, the CTT exception logic 135 can operate to raise an execution exception when a given µop decoded from a control transfer instruction to be retired is not directly followed by an appropriate CTT µop, as described herein. In an embodiment, this determination can be based at least in part on an inserted fault µop and the state information communicated with the µops exiting from decode unit 110. If a CTT fault µop is detected, an execution exception is raised and is communicated to a fault handler 140, which can take various actions in accordance with a given handler to resolve the faulting behavior. Thus, in an embodiment, when a next pop presented to retire after a control transfer µop is not an appropriate CTT µop, the retirement unit 130 can deliver an fault-class execution exception (e.g., a general protection fault) responsive to this CTT fault µop such that the µop does not retire.

Still referring to FIG. 1, in the case where a misprediction occurs and µops are to be re-executed according to a correct branch, the retirement unit 130 can communicate via a feedback path 138 with decode unit 110 to thus provide an indication of a proper branch or other code flow to be taken. Still further, a state machine recovery signal can be communicated via this feedback path 138 such that the state machine 116 of CTT logic 115 can be placed into an appropriate state to reflect this change in program flow. Stated another way, when a fault µop is present in a mispredicted path, an execution exception is not raised due to this misprediction, and accordingly, the state machine recovery signal can cause the state machine 116 to pass from a WAIT state back to an IDLE state (or to remain in a WAIT state), and to also indicate the last successful instruction to retire, so that the decode unit 110 can decode instructions of the correct branch.

Figure 2:
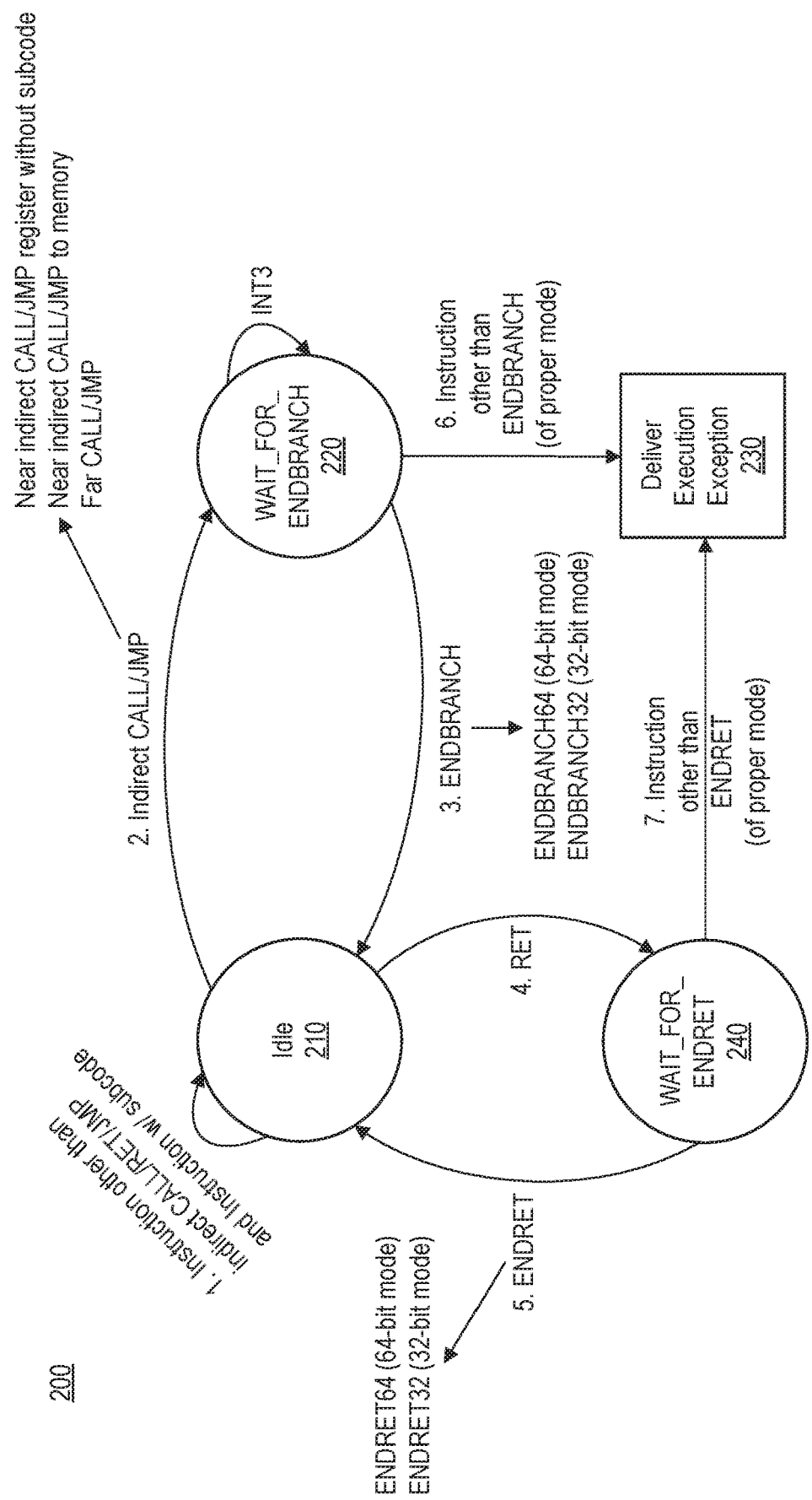
FIG. 2 is a block diagram of a state machine in accordance with an embodiment of the present disclosure.

FIG. 2 is a block diagram of a state machine 200 in accordance with an embodiment of the present disclosure. The state machine 200 can correspond to the CTT state machine 116 of FIG. 1 or to other processing logic of the portion 100 of the processor. The state machine 200 begins operation in an IDLE state 210 into which the state machine is placed by the CTT logic 115 after reset of a processor.

When some other instructions or an indirect CALL or JMP instruction that includes a certain subcode (such as 3EH or other opcode, for example) is decoded, the state machine can remain in the IDLE state 210. The subcode can be included as a prefix, a suffix or somewhere within the CALL or JMP instruction (e.g., in a header) that signals to the decode unit 110 that the state machine 200 is not to track the CALL or JMP instruction and carries no risk of aiding to the generation of a gadget. Table 1, below, is an example of the subcode functioning in this way so that the CALL or JMP instruction is not tracked.

TABLE 1

```
int main(int argc, char **argv)
{
    int i;
    i = foo( );
    switch(i)
    {
        case 1:
            printf("Case 1\n");
            break;
        case 2:
            printf("Case 2\n");
            break;
        case 3:
            printf("Case 3\n");
            break;
        case 4:
            printf("Case 4\n");
            break;
        case 5:
            printf("Case 5\n");
            break;
        default:
            printf("Nothing\n");
            break;
    }
    return 0;
}
0000000000400a50 <main>:
400a50:   f3 0f 1e fa              endbr64
400a54:   55                       push   %rbp
400a55:   48 89 e5                 mov    %rsp,%rbp
400a58:   48 83 e4 80              and    $0xffffffffffffff80,%rsp
400a5c:   48 81 ec 80 00 00 00     sub    $0x80,%rsp
400a63:   33 f6                    xor    %esi,%esi
400a65:   bf 03 00 00 00           mov    $0x3,%edi
400a6a:   e8 81 00 00 00           callq  400af0
                                   <new_feature_proc__ init>
400a6f:   0f ae 1c 24              stmxcsr (%rsp)
400a73:   81 0c 24 40 80 00 00     orl    $0x8040,(%rsp)
400a7a:   0f ae 14 24              ldmxcsr (%rsp)
400a7e:   0f 31                    rdtsc
400a80:   ff c8                    dec    %eax
400a82:   83 f8 04                 cmp    $0x4,%eax
400a85:   77 47                    ja     400ace <main+0x7e>
400a87:   48 8b 04 c5 08 1d 40     mov    0x401d08(,%rax,8),%rax
400a8e:   00
400a8f:   3e ff e0                 no-trk jmpq  *%rax
400a92:   bf 30 1d 40 00           mov    $0x401d30,%edi
400a97:   e8 84 fe ff ff           callq  400920 <puts@plt>
400a9c:   eb 3a                    jmp    400ad8 <main+0x88>
400a9e:   bf 38 1d 40 00           mov    $0x401d38,%edi
400aa3:   e8 78 fe ff ff           callq  400920 <puts@plt>
400aa8:   eb 2e                    jmp    400ad8 <main+0x88>
400aaa:   bf 40 1d 40 00           mov    $0x401d40,%edi
400aaf:   e8 6c fe ff ff           callq  400920 <puts@plt>
400ab4:   eb 22                    jmp    400ad8 <main+0x88>
400ab6:   bf 48 1d 40 00           mov    $0x401d48,%edi
400abb:   e8 60 fe ff ff           callq  400920 <puts@plt>
400ac0:   eb 16                    jmp    400ad8 <main+0x88>
400ac2:   bf 50 1d 40 00           mov    $0x401d50,%edi
```

TABLE 1-continued

```
400ac7:   e8 54 fe ff ff           callq  400920 <puts@plt>
400acc:   eb 0a                    jmp    400ad8 <main+0x88>
400ace:   bf 58 1d 40 00           mov    $0x401d58,%edi
400ad3:   e8 48 fe ff ff           callq  400920 <puts@plt>
400ad8:   33 c0                    xor    %eax,%eax
400ada:   48 89 ec                 mov    %rbp,%rsp
400add:   5d                       pop    %rbp
400ade:   c3                       retq
```

In this example, the C code at the top of Table 1 is translated by a compiler 10 into the sequence of instructions that is shown below the C program. Here the code at address 400a8f is the no-track (subcode) jump emitted by the compiler. The compiler 108 can safely emit the no-track indirect jump here because the compiler has sanitized the jump locations at address 400a82 and 400a85 to ensure that the jump target is within bounds and the offset used for the targets of the jump are known at compile time. In this way, the compiler 108 can avoid emitting the ENDBRANCH64 (endbr64) instruction at the targets of, for example, addresses 400aaa and 400ab6 that follow this CALL or JMP instruction.

When an indirect CALL or JMP instruction lacking the subcode is decoded (or any far CALL or JMP or a CALL or JMP that accesses memory is decoded), the state machine enters a WAIT_FOR_ENDBRANCH state 220. When the next instruction that is decoded is not an ENDBRANCH instruction of the proper operation mode (e.g., END-BRANCH32 for 32-bit or compatibility modes and END-BRANCH64 for 64-bit mode), then the state machine 200 performs a DELIVER_EXECUTION_EXCEPTION operation 230 which can also cause generation of a fault μop (and the state machine 200 can remain in the WAIT_FOR_END-BRANCH state 220). When, instead, the next instruction to be decoded following a control transfer instruction is an ENDBRANCH instruction of the proper mode, the state machine 200 transitions back to the IDLE state 210.

The INT3, shown as circling within the WAIT_FOR_ENDBRANCH state 220, is an instruction that is used to invoke a debugger for the state machine 200. When an INT3 instruction is encountered at the target of an indirect CALL or JMP, the state machine 200 is maintained in the WAIT_FOR_ENDBRANCH state 220. This is to support breakpoint generation by debuggers. The way a debugger sets up breakpoints in a program is by replacing the code byte at the address where the debugger wants to break with an INT3 instruction. This gives control to the debugger. The debugger can then examine the program state and then return the original code bytes that were replaced by the INT3 and restart program execution at that address. By retaining the state of the program as WAIT-FOR-ENDBRANCH when this program is restarted by the debugger, the hardware verifies whether the debugger has put back the code bytes for ENDBRANCH (that it had originally replaced with INT3).

When a RET instruction is decoded, the state machine 200 can determine whether the RET instruction includes the subcode indicating that a target of the RET instruction is valid and safe. (Note that in some instruction architectures, the check for the subcode can be unnecessary if the RET instructions do not access memory to determine a target address, e.g., there is no threat of gadget generation.) When the RET instruction includes the subcode, the state machine 200 can remain in the IDLE state. Otherwise, when the RET instruction lacks the subcode, the state machine can enter the WAIT_FOR_ENDRET state 240.

When the next instruction that is decoded is not an ENDRET instruction of the proper mode (e.g., ENDRET32 for 32-bit or compatibility modes and ENDRET64 for 64-bit mode), the state machine 200 performs the DELIVER_EXECUTION_EXCEPTION operation 230. When the next instruction that is decoded is an ENDRET instruction of the proper mode, the state machine 200 transitions back to the IDLE state 210.

The state machine 200 thus enforces the following rules: the instruction at the target of a RET instruction must be an ENDRET instruction of the proper mode and the instruction at the target of an indirect CALL or indirect JMP instruction must be an ENDBRANCH instruction of the proper mode. When these rules are violated, then the violating instruction (the instruction at the target of a RET or CALL/JMP instruction) faults and is prevented from retiring by the retirement unit 130.

Thus by placing ENDBRANCH32 or ENBRANCH64 and ENDRET32 or ENRET64 instructions in a program at valid control transfer locations, a programmer or compiler can prevent unintended control transfers from happening. This placement of ENDBRANCH and ENDRET instructions is as illustrated below in Table 2, as an example:

TABLE 2

```
main( ) {
    int (*f)( );
    f = foo;
    f( );
}
int foo( ) {
    return
}
0000000000400513
<main>:
endbranch64
push %rbp
mov %rsp,%rbp
sub $0x10, %rsp
movq $0x4004fb, -8(%rbp)
mov -8(%rbp), %rdx
mov $0x0, %eax
call *%rdx
endret64
Leaveq
Retq
00000000004004fb <foo>:
endbranch64
push %rbp
mov %rsp,%rbp
leaveq
retq
```

In this example, the C code at the top of Table 2 is translated by a compiler into the sequence of instructions that is shown below the C program. The compiler 108 places an ENDBRANCH64 instruction as the first instruction in the subroutine foo and in the main program, and an ENDRET64 instruction is placed after the CALL instruction to subroutine foo. Thus there are now three ("3") valid control transfer points in this program. Specifically, in execution of the main program, a call instruction (call *% rdx) is executed, causing a control transfer to the subroutine foo, the first instruction in this subroutine is an ENDBRANCH64 instruction, such that a valid control transfer occurs and the CTT state machine thus proceeds from an IDLE state, to a WAIT_FOR_ENDBRANCH state and back to the IDLE state, without raising a fault.

Similarly, at the conclusion of the subroutine foo, a return instruction (RETQ) is executed, thus causing control to transfer to the first instruction after the calling instruction in the main program. Here, this instruction is an ENDRET64 instruction and as such, a valid control transfer occurs. In this case, the CTT state machine proceeds from the IDLE state, to the WAIT_FOR_ENDRET state, and thereafter back to the IDLE state, without raising a fault.

Thus, using CTT processing logic in accordance with an embodiment of the present disclosure, a constraint is introduced that a ROP gadget be preceded with an ENDRET32 (or ENDRET64) to be usable, effectively eliminating the possibility for a sequence of instructions to be used as a ROP gadget. As such, a significant reduction in the number of gadgets that can be harvested from a library is realized, and the quality of such gadgets is significantly lower in terms of functionality that these remaining gadgets expose, making ROP attacks harder to execute.

Figure 3A:
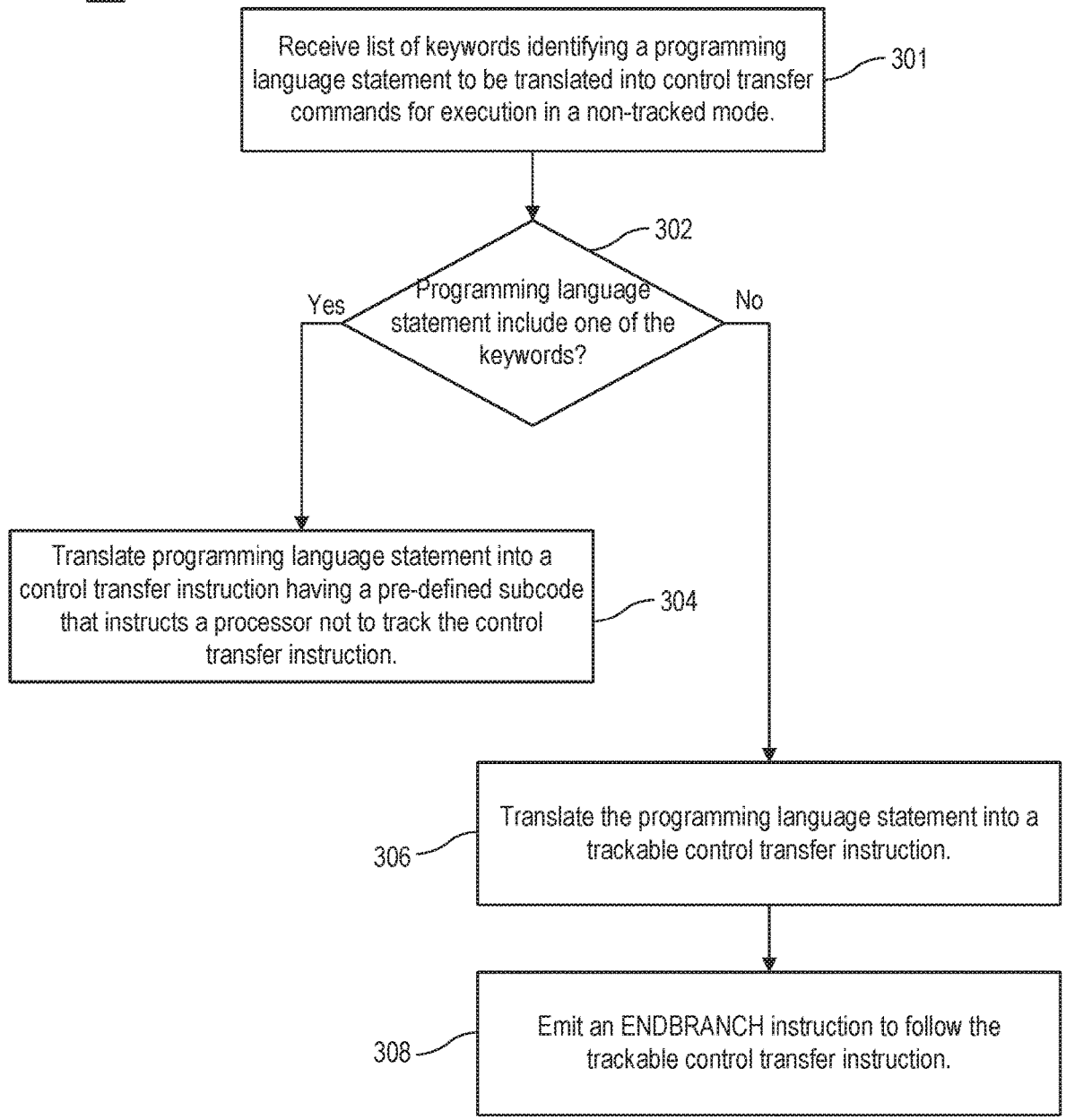
FIG. 3A is a flow chart of a method of a compiler deciding whether to add a pre-defined subcode to control transfer instructions of a high-level programming language.

FIG. 3A is a flow chart of a method 300 of a compiler deciding whether to add a pre-defined subcode to control transfer instructions of a high-level programming language. The method can begin by receiving, by a processing device executing a high-level programming language compiler, a list of keywords identifying a programming language statement to be translated into control transfer commands for execution in a non-tracked mode (301). The keywords can include a switch-case statement or a table lookup, for example, where the destination address is known at compile time.

The method 300 can continue by determining whether the programming language statement includes a keyword from the list of keywords (302). Responsive to determining that the programming language statement includes a keyword from the list of keywords, the method can continue by translating the programming language statement into a control transfer instruction having a pre-defined subcode, the pre-defined subcode to instruct a processor not to track the control transfer instruction (304). Responsive to determining that the programming language statement does not include a keyword from the list of keywords, the method can continue by translating the programming language statement into a trackable control transfer instruction (306) and emitting an ENDBRANCH instruction to follow the trackable control transfer instruction (308).

Figure 3B:
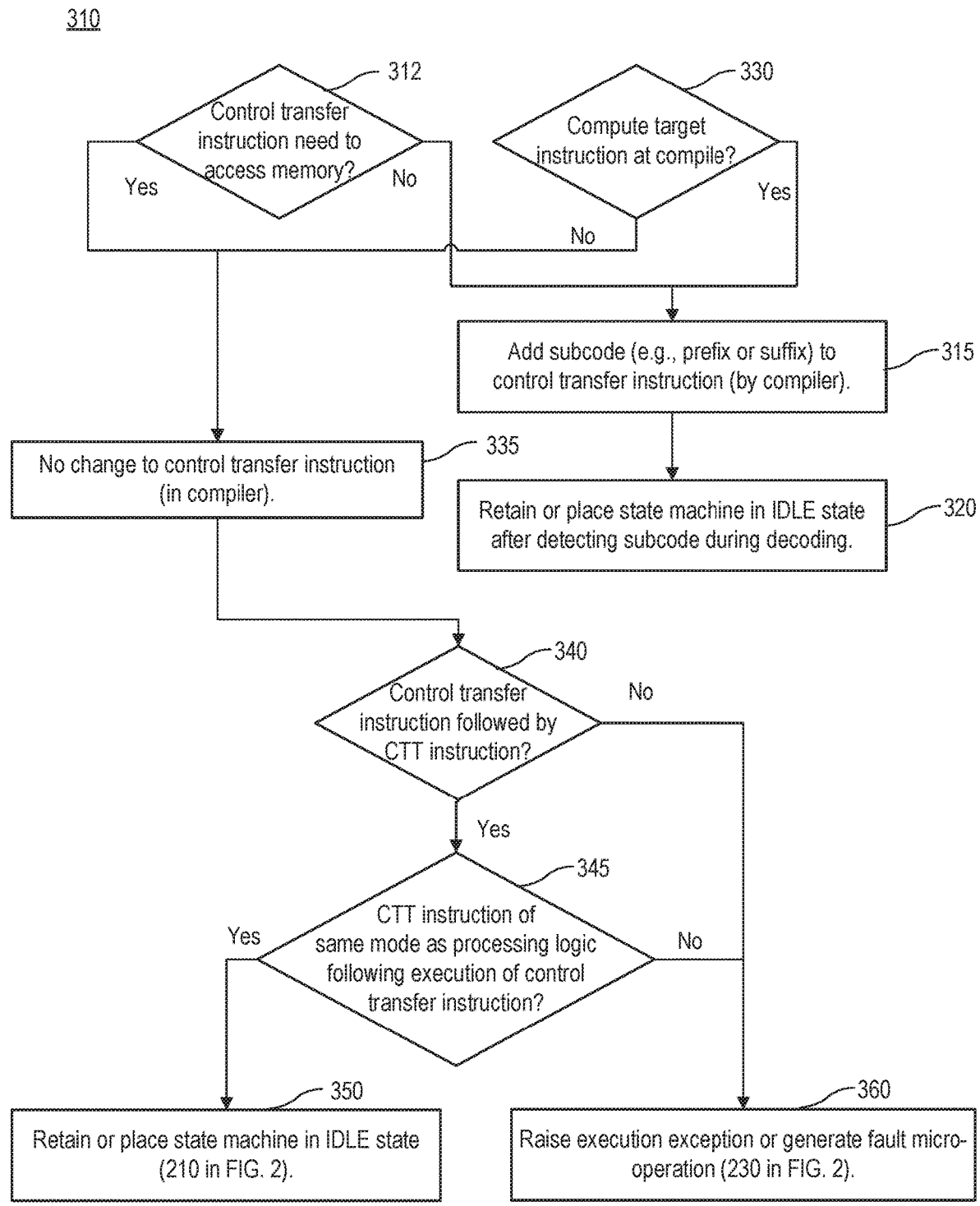
FIG. 3B is a flow chart of a method for non-tracked control transfers and mode-specific control flow termination according to an embodiment of the present disclosure.

FIG. 3B is a flow chart of a method 310 for non-tracked control transfers and mode-specific control flow termination according to an embodiment of the present disclosure. The method 310 can be performed by a compiler and by a processor that includes a control transfer termination (CTT) state machine (e.g., processing logic of a decode unit). The method 300 can determine whether a control transfer instruction needs to access memory to determine an address of a target instruction of an indirect call, jump or return (control transfer) instruction (312). The method 310 can also determine whether a target instruction of the control transfer instruction is computed at compile time by the compiler (330). When the answer is no in block 312 and/or yes in block 330, the compiler can add a subcode (such as a prefix or suffix) to the control transfer instruction (315). The state machine can then be placed or retained in an IDLE state (320) for that control transfer instruction, after decoded, in response to detecting the subcode in the control transfer instruction.

When the answer is yes to block 312 and/or no to block 330, the compiler can compile program instructions as before, adding CTT instructions following control transfer instructions as directed (335). The method 310 can then continue, during decoding, by determining whether the control transfer instruction is followed by a CTT instruction (340). When no, then the processing logic raises an execution exception or generates a fault micro-operation as in step 230 of FIG. 2 (360). If the answer is yes to block 340, then the method continues with determining whether the CTT instruction is of the same mode as the processing logic following the execution of the control transfer instruction (whether 32-bit mode or 64-bit mode, for example) (345). When the answer is yes to block 345, then the processing logic can place or retain the state machine in an IDLE state (350), corresponding to state 210 in FIG. 2. When the answer is no to block 345, then the processing logic raises an execution exception or generates a fault micro-operation as discussed with respect to as in step 230 of FIG. 2 (360). The processor can then take appropriate action in response to the execution exception or the fault. In one embodiment, the retirement unit 130 can send an execution exception to the fault handler 140 upon receipt of the fault micro-operation through the pipeline of the portion 100 of the processor.

Figure 4:
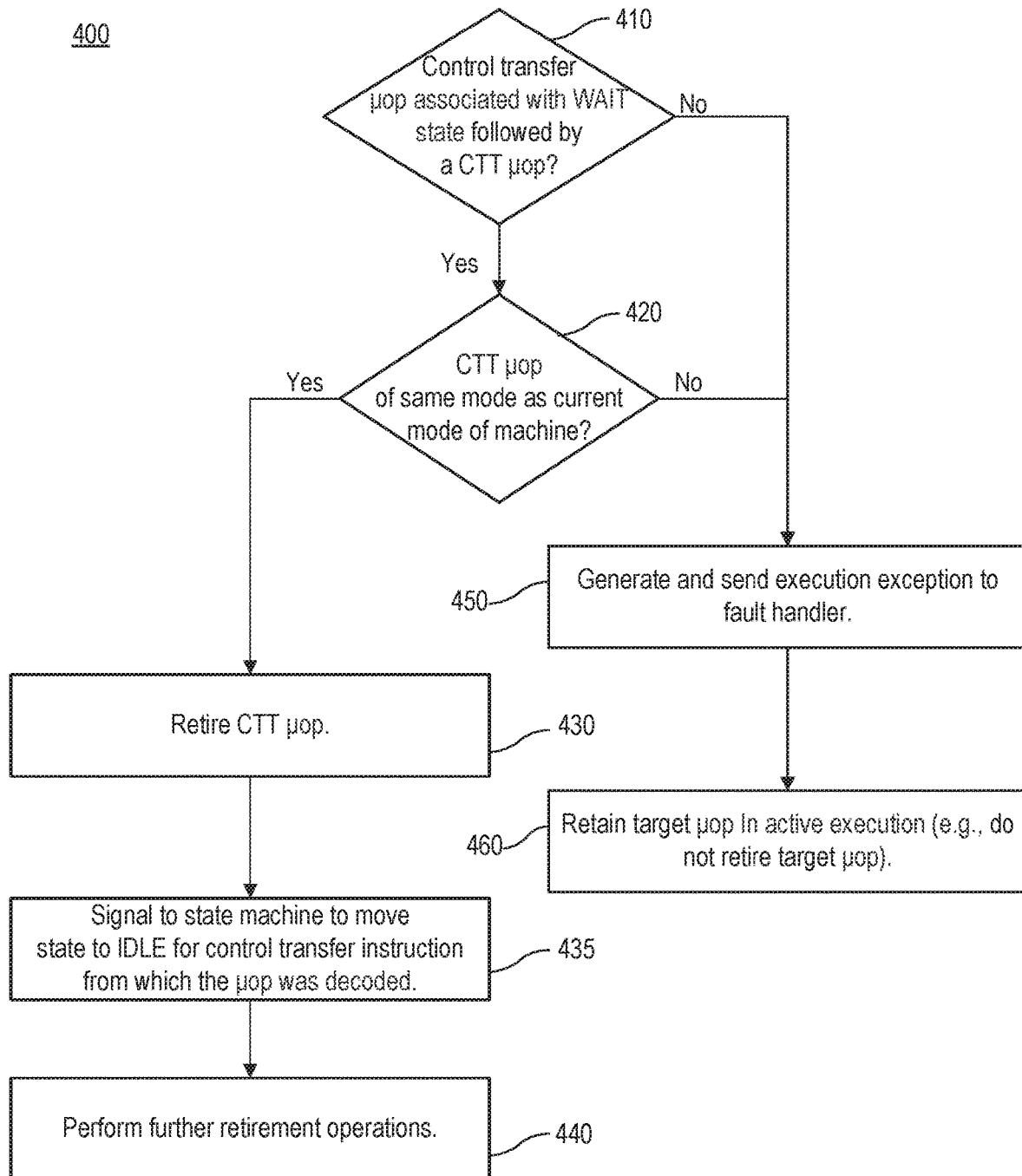
FIG. 4 is a flow chart of another method for mode-specific control flow termination according to another embodiment of the present disclosure.

FIG. 4 is a flow chart of another method 400 for mode-specific control flow termination according to another embodiment of the present disclosure. The method 400 can be performed by logic of a retirement unit to handle CTT-based retirement operations. The method 400 can begin by determining whether a control transfer micro-instruction (pop) associated with a WAIT state (from a CTT state machine) is followed by a CTT plop (410). When the answer is no, then the method generates a fault and sends the fault to a fault handler (450). When the answer is yes, then the method 400 can further determine whether the CTT μop is of the same mode as the current mode of the machine (420), whether of a 32-bit or a 64-bit mode, for example. When the answer to block 420 is yes, the logic can retire the CTT μop (430), signal to the state machine to move the state to IDLE (435), and perform further retirement operations (440). When the answer is no at block 420, the logic can generate and send an execution exception to the fault handler (450). The logic can also retain the target μop in active execution, e.g., not retire the target μop (which could belong to a gadget) contingent on the fault handler resolving the execution exception (460).

Figure 5A:
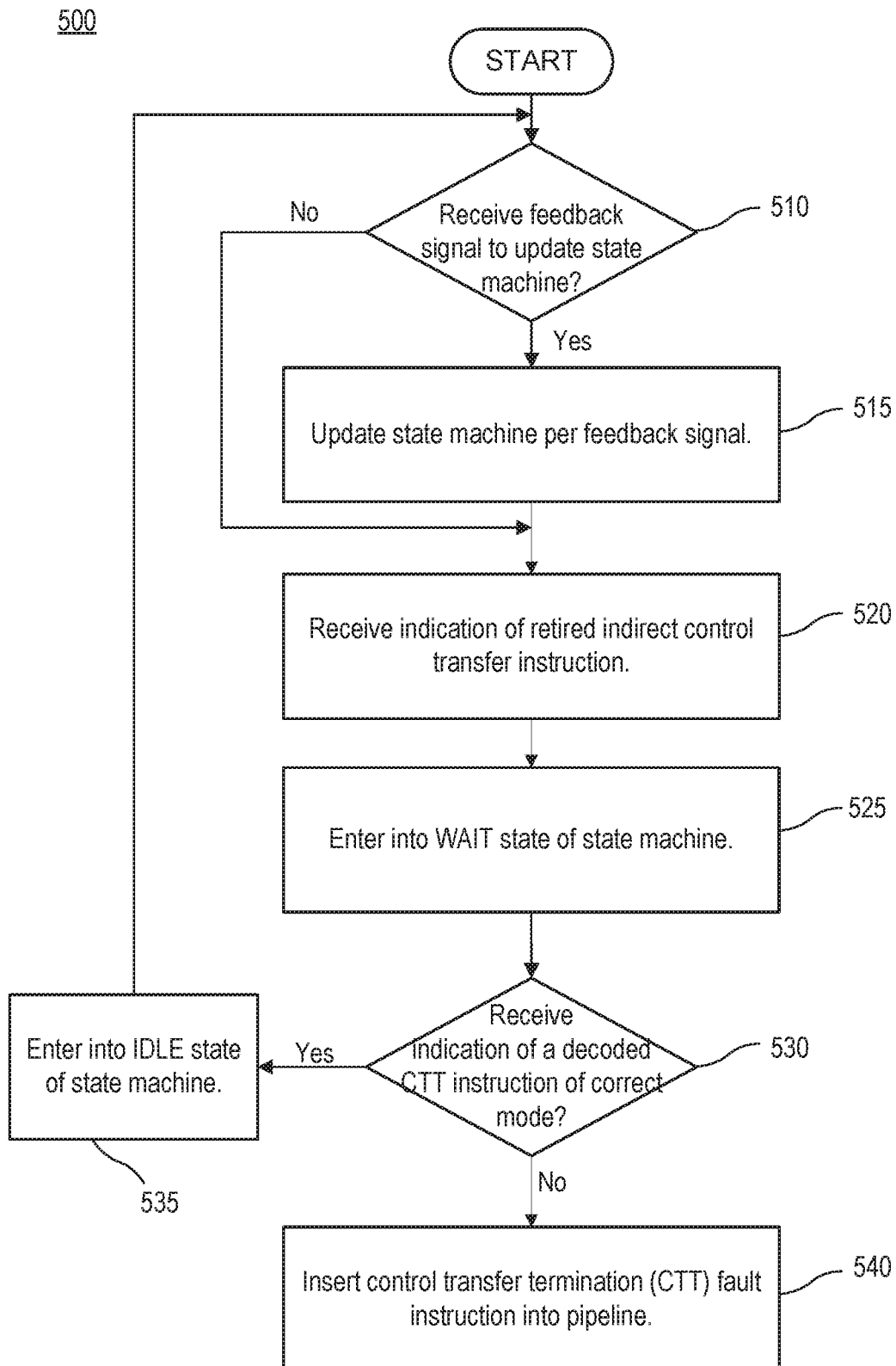
FIG. 5A is a flow diagram of a method of control transfer management in accordance with an embodiment of the present disclosure.

FIG. 5A is a flow diagram of a method 500 of control transfer management in accordance with an embodiment of the present disclosure. As shown, the method 500 can be performed by a processor including a control transfer termination (CTT) state machine as described herein. Note that the operations shown in FIG. 5A relate to state machine operations for control transfer-related instructions. For other instructions, if the state machine is currently in the IDLE state, the state machine remains in the IDLE state. The method 500 can begin by determining whether a feedback signal is received to update the CTT state machine (510). In an embodiment, this feedback signal can be received from a retirement unit or fault handler to cause the state of the state machine to transition to a given state, e.g., due to a misprediction (as from a retirement unit) or responsive to resolving a fault (as from a fault handler). If such feedback signal was received, control passes to block 515 where the state machine is updated with the state communicated through this feedback signal.

From both of these cases, control passes next to block 520 where an indication that an indirect control transfer instruction such as a call, jump or return has occurred (assuming that the decode unit has decoded such an instruction). And as such, control passes to block 525 where a transition into a WAIT state of the state machine can occur.

Still referring to FIG. 5A, method 500 can further determine whether an indication of a control transfer termination instruction of the correct mode is received (530). If so, control passes to block 535 where the IDLE state of the state machine is entered, as pursuant to this proper CTT instruction following the control transfer instruction, a valid control transfer occurs.

When instead the method 500 determines that the next decoded instruction is not a CTT instruction or is a CTT instruction that does not match the current mode of the machine, control passes to block 540 where a control transfer termination fault instruction can be inserted into the processor pipeline. Note here that the state of the state machine does not change and thus remains in the selected WAIT state. In an embodiment, this fault instruction is a μop that travels through the processor pipeline and if it is selected for retirement, the retirement unit causes a fault to enable an OS-based fault handler to execute to determine the cause of the fault and take appropriate action.

Figure 5B:
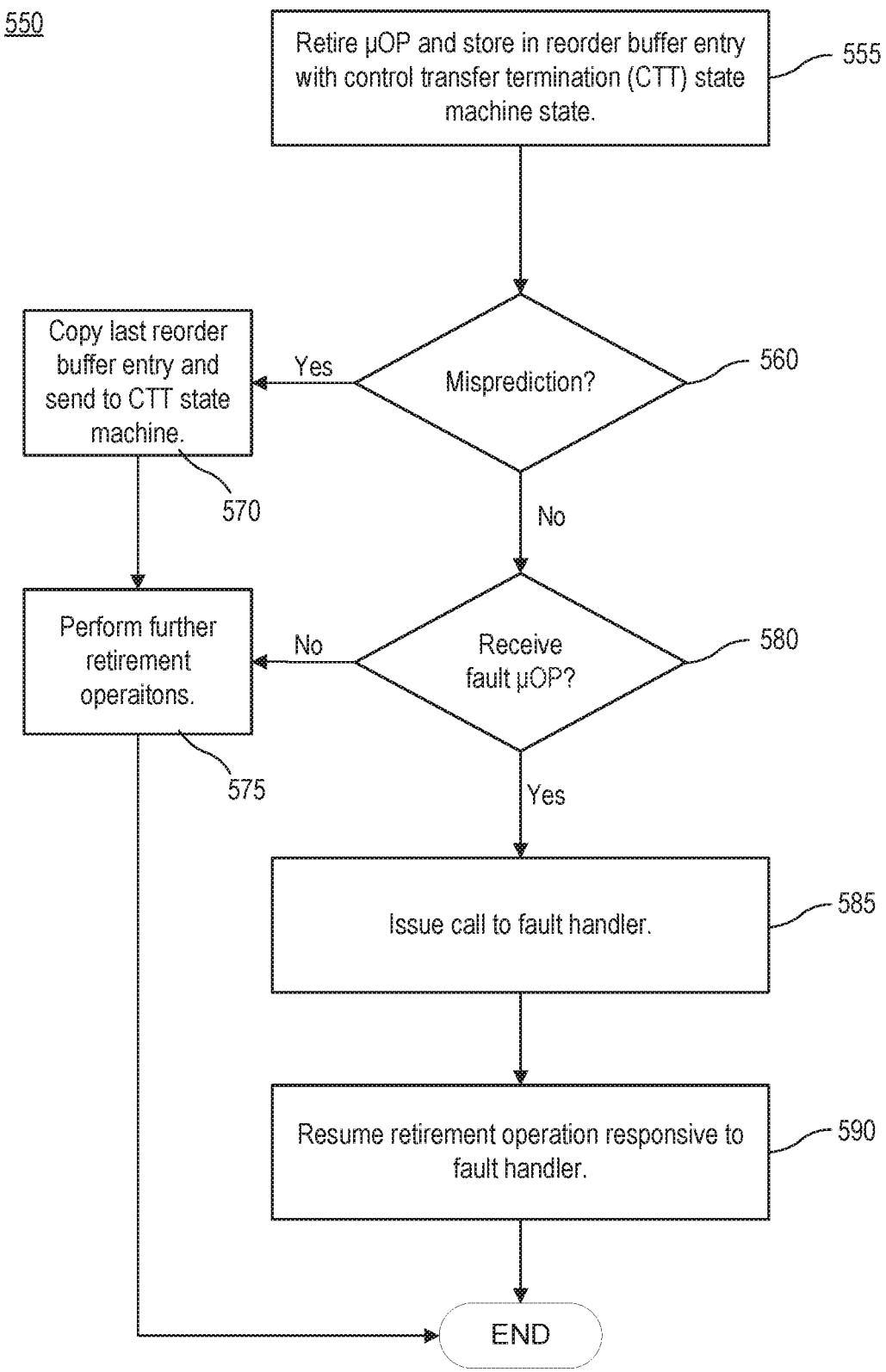
FIG. 5B is a flow diagram of another method of control transfer management in accordance with an embodiment of the present disclosure.

FIG. 5B is a flow diagram of another method 550 of control transfer management in accordance with an embodiment of the present disclosure. The method 550 can be performed at least in part by logic of a retirement unit to handle CTT-based retirement operations. As seen, the method 550 begins by retiring a given micro-instruction (a pop) and storing a CTT state associated with the μop (555). In an embodiment, this information can be stored in a given storage of the retirement unit such as reorder buffer entry. As will be discussed further below, this state can be used in case a misprediction occurs. Next, the method 500 determines whether a misprediction has occurred. If so, control passes to block 570 where information regarding the last validly retired μop present in an entry of the reorder buffer can be obtained and sent back to CTT logic (of the decode unit) to enable updating the state of the state machine into the appropriate state. There further typical retirement operations can continue (575).

Referring still to FIG. 5B, when a fault μop is received (580), control passes to block 585 where a call can be issued to a fault handler. As an example, an OS-based fault handler can be executed. As part of this fault handling, when the fault is due to a CTT fault pop, a supervisor-based CTT state machine can be enabled and used to access the state of the user mode CTT state machine to determine the reason for the fault and to act accordingly. As an example, a target μop (namely a non-CTT target pop) can be prevented from retiring and an appropriate correction mechanism can be performed. Or, the fault handler can take any other action. As part of such operations, the fault handler can cause the user mode CTT state machine to be set to the appropriate state. After completion of the fault handler, retirement operations can be resumed responsive to control of the fault handler (590).

With CTT instructions enforcing valid control transfer locations, software checks can be placed after these instructions to further check for valid control transfers using techniques like stack canaries. Stack canaries are used to detect stack buffer overflow. This is done by placing a random number on the stack before the return address on entering a function and checking this random number before return from the function. The CTT logic 115 provides strong positions in the program to add additional checks for detecting buffer overflows. Without CTT logic, these checks could be bypassed. CTT logic, therefore, ensures that these checks cannot be bypassed since the function must be called at the Endbranch and not past the Endbranch to skip the checks. For the example discussed above, reference is made to Table 3:

TABLE 3

```
main( ) {
    foo( );
    endret32;
    <detour/hook to anti-malware code to perform branch sanity check>
    ...
{
int foo( ) {
    return
}
```

In the example above, there is thus one place in the program (after the ENDRET32) where such a check is to be placed. Without the CTT processing logic, software cannot effectively check all places that can be used as gadgets as these gadgets can be crafted out of byte sequences in the middle of valid instructions.

The execution of a program using CTT instructions can be performed by a compiler. In an embodiment, a just-in-time (JIT) compiler or a regular (cc) compiler can perform the instrumentation of the CTT instructions. Alternately such instrumentation can be performed by rewriting the program binary to insert the CTT instructions using a binary rewriting tool that reconstructs the control flow graph from the application binary. The binary rewriting technique can be used in cases where the source of the binary is not available for recompilation. Such binary rewriting can also be done by anti-malware software using such tools.

In some cases, applications and libraries compiled with CTT instrumentation can be merged with libraries that are not compiled with CTT instrumentation, such as non-CTT instrumented libraries referred to herein as "legacy libraries."

To support continued operation with these legacy libraries, embodiments can provide additional instructions. In one such embodiment, a suppression instruction, referred to herein as a DISCTT instruction, can be used to suppress the CTT state machine such that it stays in the IDLE state instead of transitioning to the WAIT_FOR_ENDBRANCH or WAIT_FOR_ENDRET states on an indirect CALL/JMP or RET, respectively. Additionally this instruction returns, in a general purpose register, the state of the CTT suppression at the time the instruction was issued. An enable instruction, referred to herein as an ENCTT instruction, is used to remove the suppression of the CTT state machine put in place by the DISCTT instruction such that the state machine enforces the CTT rules. Additionally, this instruction returns the state of the CTT suppression at the time the instruction was issued.

The use of DISCTT and ENCTT instructions can be enabled for a process by an operating system. If the operating system does not allow a program to disable CTT, then the DISCTT instruction executes as a NOP and does not suppress CTT.

The use of the DISCTT and ENCTT instructions in a program to perform legacy interworking is illustrated below in Table 4.

TABLE 4

```
// Issue a DISCTT before invoking a legacy library function foo( )
temp_variable = DISCTT;
foo( );
// If CTT was suppressed by DISCTT prior to this legacy library call then un-suppress it
IF (temp_variable == NOT_SUPPRESSED)
    ENCTT;
ENDIF
```

Returning the previous state of CTT as a result of the DISCTT instruction allows for supporting call chains like below:

CTT_function1→legacy_function1→CTT_function2→legacy_function2.

Here the CTT_function1 issues a DISCTT instruction before calling the legacy_function1. The DISCTT instruction returns the current state of CTT functionality as NOT_SUPPRESSED and then suppresses the CTT functionality. The legacy_function1 calls the CTT_function2. Now when the CTT_function2 calls legacy_function2, it again issues a DISCTT instruction. The DISCTT instruction now returns the current state of the CTT functionality as SUPPRESSED since it has been suppressed by CTT_function1. When the control returns from legacy_function2 to CTT_function2, it does not un-suppress the CTT functionality since it was already suppressed when it was invoked. When the control returns to CTT_function1, it un-suppresses the CTT functionality using the ENCTT instruction since it was suppressed by that function.

Returning the previous state of CTT responsive to the ENCTT instruction allows for a CTT-enabled library function to be called by a non-CTT enabled library/application to un-suppress CTT before it starts executing and suppress CTT functionality before returning to the caller, if it was suppressed when the function was called.

This is as illustrated below in Table 5:

TABLE 5

```
Legacy_function1( )
{
    CTT_function1( );
}
CTT_function1( )
{
    //ENDBRANCH is a NOP if this function was called with CTT suppressed/disabled ENDBRANCH;
    // Un-suppress CTT. If already unsuppressed this is gratuitous
    temp_variable = ENCTT;
    ....
    ....
    ....
    // If CTT was suppressed when this function was called the suppress
    // it before returning
    IF ( temp_variable == SUPPRESSED )
        DISCTT;
    ENDIF
    RET;
}
```

Figures 6, 7A:
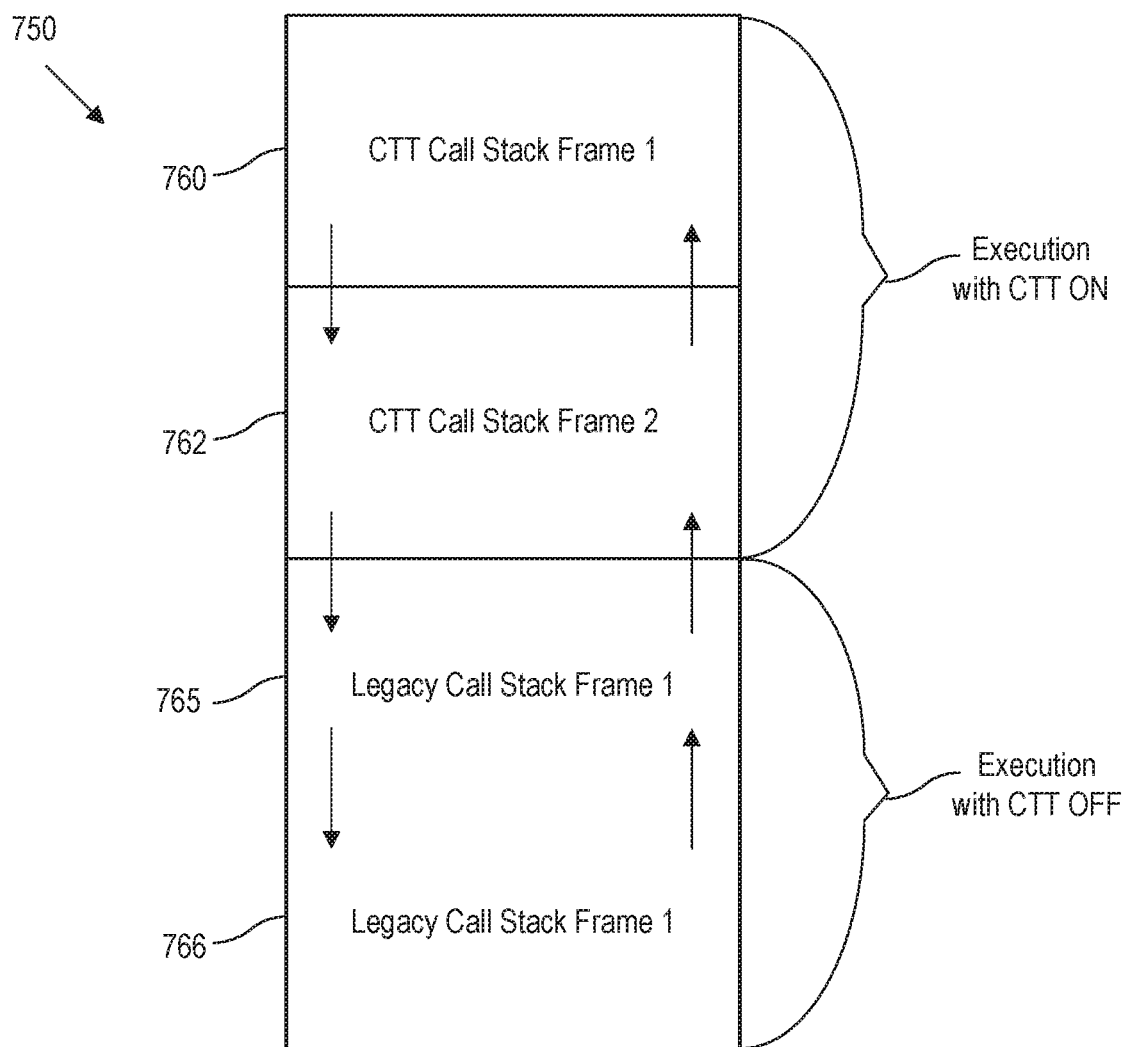
FIG. 6 is a block diagram of a configuration register in accordance with an embodiment of the present disclosure.
FIG. 7A is a block diagram of a call stack frame for code execution in accordance with an embodiment of the present disclosure.

FIG. 6 is a block diagram of a configuration register in accordance with an embodiment of the present disclosure. As shown in FIG. 6, configuration register 600 can include various fields to store state values used in performing CTT functionality. In an embodiment, two such configuration registers can be provided, with each register associated with a particular mode of operation. Stated another way, one configuration register can be used to control CTT operation in a user mode (e.g., ring 3) while a second configuration register can be used to control CTT functionality in a supervisor mode (e.g., rings less than 3).

In the embodiment shown, configuration register 600 includes an enable field 605 to store an enable indicator to indicate whether CTT is enabled for the current privilege level. A legacy enable field 610 can be used to store an indicator to indicate whether legacy interworking is enabled. A suppression field 615 can be used to store a suppression indicator to indicate whether CTT faults and tracking are to be suppressed. A tracker field 620 can be used to store a value of the CTT state machine. In an embodiment, this tracker field can be three bits where a value of zero ("0") can indicate the IDLE state, a value of one ("1") can indicate a WAIT_FOR_ENDRET32 state, a value of two ("2") can indicate a WAIT_FOR_ENDRET64 state, a value of three ("3") can indicate a WAIT_FOR_ENDBRANCH32 state, and a value of four ("4") can indicate a WAIT_FOR_ENDBRANCH64 state. A reserved field 425 can be used for various extensions. Other fields can be present in other embodiments than those specifically shown in FIG. 4.

Referring now to FIG. 7A, shown is a block diagram of a call stack frame for code execution that interlaces CTT-enabled code and legacy code without CTT-enabled functionality. As shown in FIG. 7, a code segment 750 includes a first CTT call stack frame 760 and a second CTT call stack frame 762 that in turn calls a legacy call stack frame 765. Thus at the point of calling this legacy call stack frame, the CTT functionality is disabled responsive to a DISCTT instruction. Thus at this point execution begins with CTT functionality disabled for a first legacy call stack frame 765 and a second legacy call stack frame 766. Note that as the called functions return back, at the point of returning to call stack frame 762, execution with CTT functionality is re-enabled by an ENCTT instruction.

As such, FIG. 7A shows an example where a first transfer to legacy code suppresses CTT, which is done using indirect CALL/JMP instructions (not RET) for security reasons. Once CTT is suppressed by a DISCTT instruction, subsequent CALL/JMP/RET instructions can land on instructions other than ENDBRANCH/ENDRET without causing faults. CTT operation is unsuppressed when control returns to the point where suppression was done, via an ENCTT instruction.

Figure 7B:
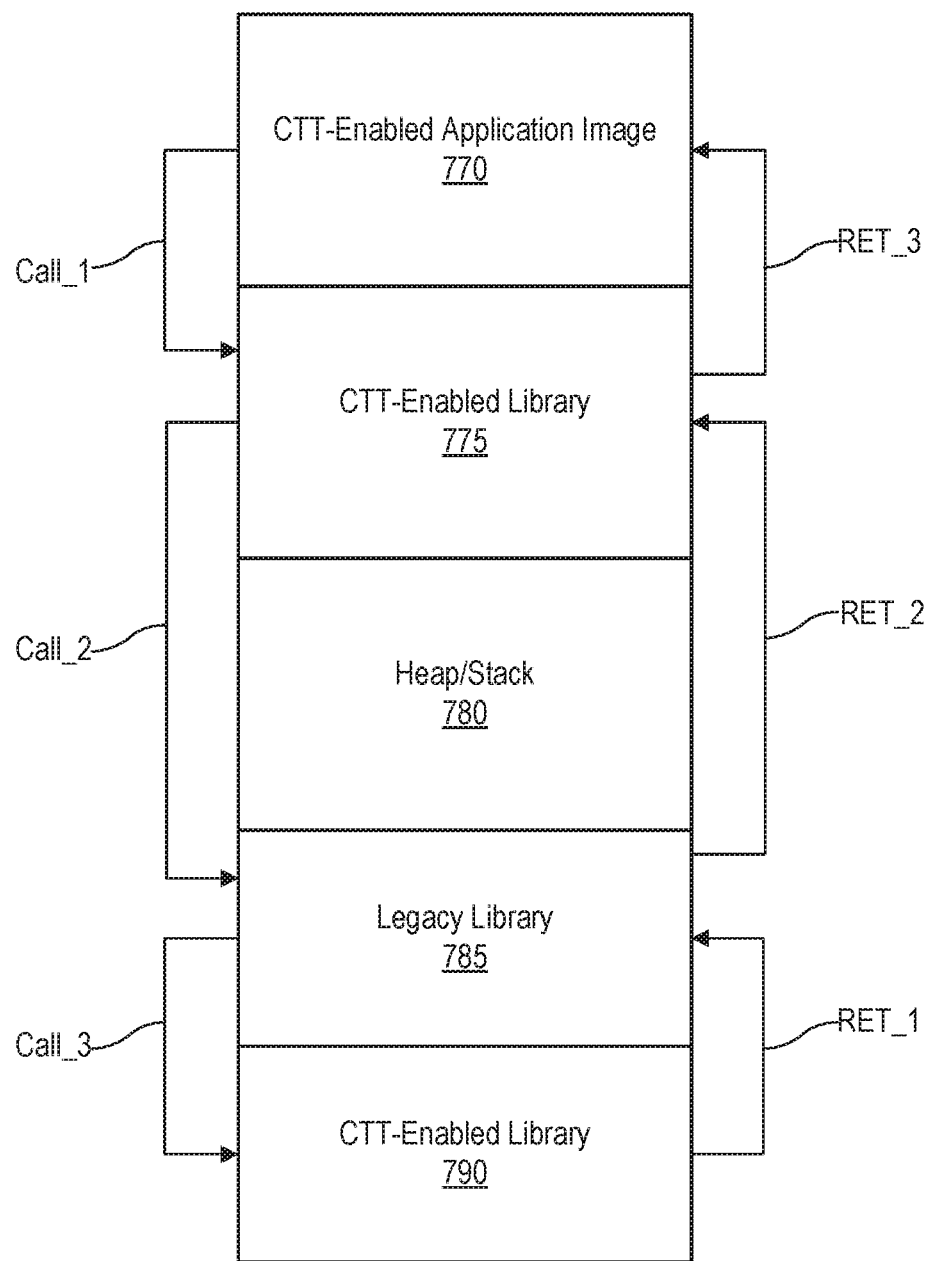
FIG. 7B is a block diagram of control transfer termination logic with legacy interworking in accordance with an embodiment of the present disclosure.

FIG. 7B is a block diagram of control transfer termination logic with legacy interworking in accordance with an embodiment of the present disclosure. As shown in FIG. 7B, an implementation is present with a CTT-enabled application image 770 that issues a call to a CTT enabled library 775 (Call_1) that in turn initiates a call to a legacy library 785 (Call_2). In turn, legacy library 785 issues a call to a second CTT-enabled library 790 (Call_3). Also present is a heap/stack 780. After execution in second CTT-enabled library 790, control passes back to legacy library 785 (RET_1), and from there control returns back to first CTT-enabled library 775 (RET_2), and finally control returns back to application image 770 (RET_3).

Note that upon Call_2, a legacy transfer occurs and thus CTT is suppressed via a DISCTT instruction. Accordingly, for Call_3, CTT remains suppressed, as it does for RET_1. Finally, RET_2 causes a return to the point of suppression and, as such, CTT is unsuppressed via an ENCTT instruction. Note that this legacy interworking can be entered when a legacy interworking enable indicator of a CTT control logic is set and an indirect control transfer (namely a jump or call) occurs to a non-ENDBRANCH instruction.

The DISCTT and ENCTT instructions can be placed in the program by the programmer if she is aware of the interworking, and/or these DISCTT and ENCTT instructions can be placed in the program by the compiler/linker when it is linking statically to legacy libraries.

When linking dynamically to libraries, a loader or anti-malware software can insert trampoline functions between the application and the library, where the trampoline functions use DISCTT and ENCTT instructions. For example, calls to functions in a legacy library that are dynamically linked to a CTT enabled application go through a trampoline function, which suppresses CTT and then calls the legacy library function. The legacy library function returns to the trampoline function that un-suppresses CTT and returns to the CTT-enabled application.

Embodiments can be used by anti-malware software to wrap non-CTT binaries such that they can be used with CTT-enabled binaries. In addition, anti-malware software can restrict the use of the gadgets that can be found in the program even with CTT in use. Embodiments can be particularly applicable to mobile and other portable low power systems, in that software only techniques to mitigate against ROP (like rewriting binaries to remove all instances of RET by use of functionally equivalent, but larger, more complex sequences), generally lead to much larger binaries and increase the execution time of the program and thereby are not suited for mobile applications where power efficiency is a primary concern.

Figure 8:
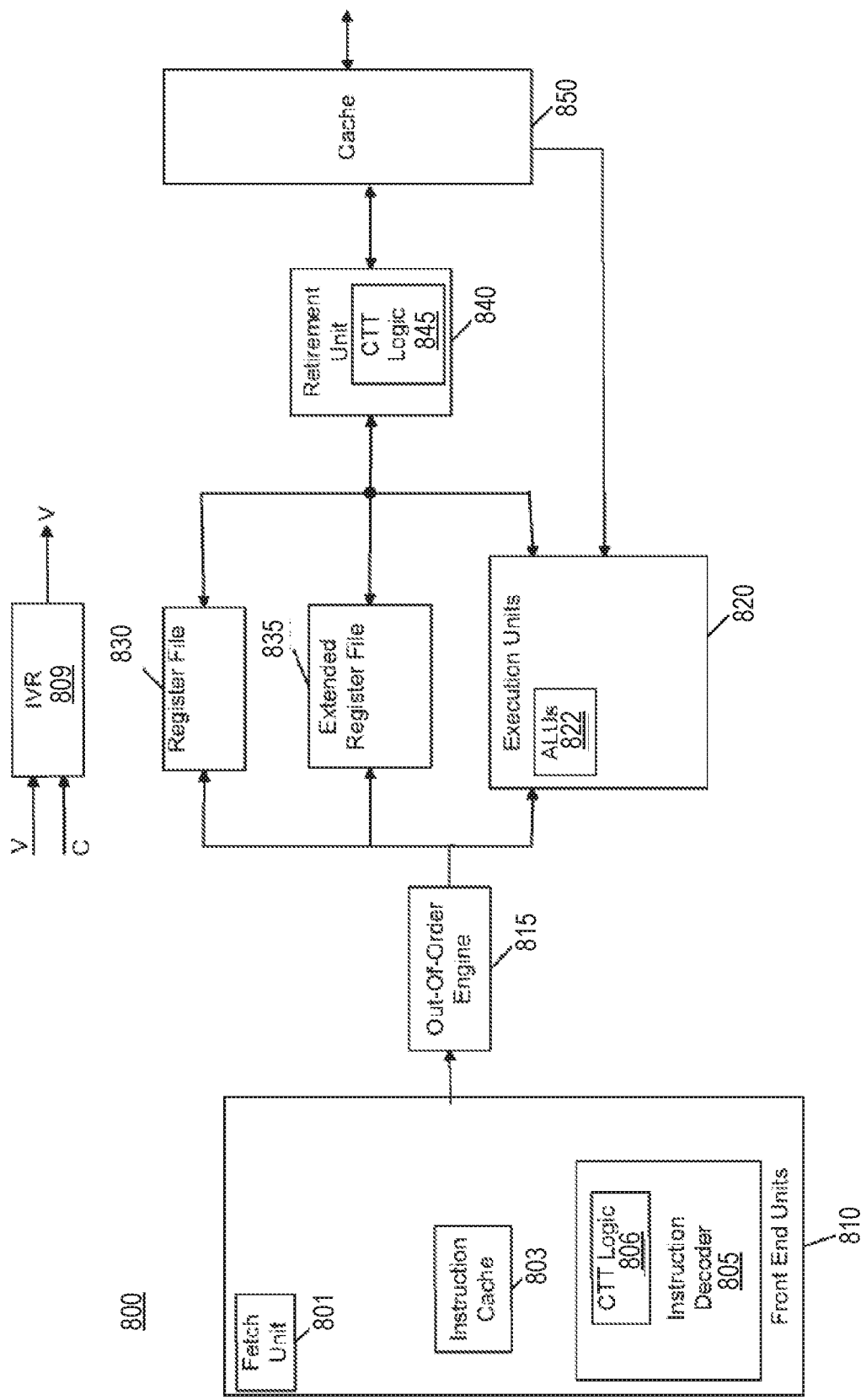
FIG. 8 is a block diagram of a processor core in accordance with one embodiment of the present disclosure.

FIG. 8 is a block diagram of a processor core 800 in accordance with one embodiment of the present disclosure. As shown in FIG. 8, the processor core 800 can be a multi-stage pipelined out-of-order processor. The core 800 can support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.). It should be understood that the core 800 can support multithreading (executing two or more parallel sets of operations or threads), and can do so in a variety of ways including time-sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

A processor including the core 800 can be a general-purpose processor, such as a Core™ i3, i5, i7, 2 Duo and Quad, Xeon™, Itanium™, XScale™ or StrongARM™ processor, which are available from Intel Corporation. Alternatively, the processor can be from another company, such as a design from ARM Holdings, Ltd, MIPS, etc. The processor can be a special-purpose processor, such as, for example, a network or communication processor, compression engine, graphics processor, co-processor, embedded processor, or the like. The processor can be implemented on one or more chips, and can be a part of and/or can be implemented on one or more substrates using any of a number of process technologies, such as, for example, BiCMOS, CMOS, or NMOS.

As shown in FIG. 8, core 800 can operate at various voltages and frequencies as a result of integrated voltage regulator 809. As seen in FIG. 8, core 800 includes front end units 810, which can be used to fetch instructions to be executed and prepare them for use later in the processor. For example, the front end units 810 can include a fetch unit 801, an instruction cache 803, and an instruction decoder 805. Instruction decoder 805 can include CTT logic 806 in accordance with an embodiment of the present disclosure, with an associated CTT state machine to perform CTT operations as described herein. In some implementations, the front end units 810 can further include a trace cache, along with microcode storage as well as a micro-operation storage. Fetch unit 801 can fetch macro-instructions, e.g., from memory or instruction cache 803, and feed them to instruction decoder 805 to decode the macro-instructions into primitives, e.g., micro-operations for execution by the processor.

Coupled between front end units 810 and execution units 820 is an out-of-order (OOO) engine 815 that can be used to receive the micro-instructions and prepare them for execution. More specifically, the OOO engine 815 can include various buffers to re-order flow of micro-instructions and allocate various resources needed for execution, as well as to provide renaming of logical registers onto storage locations within various register files such as a register file 830 and an extended register file 835. The register file 830 can include separate register files for integer and floating point operations. The extended register file 835 can provide storage for vector-sized units, e.g., 256 or 512 bits per register.

Various resources can be present in execution units 820, including, for example, various integer, floating point, and single instruction multiple data (SIMD) logic units, among other specialized hardware. For example, such execution units can include one or more arithmetic logic units (ALUs) 822, among other such execution units.

Results from the execution units can be provided to a retirement unit 840 including a reorder buffer (ROB). This ROB can include various arrays and logic to receive information associated with instructions that are executed. This information is then examined by retirement unit 840 to determine whether the instructions can be validly retired and result data committed to the architectural state of the processor, or whether one or more exceptions occurred that prevent a proper retirement of the instructions. Of course, retirement unit 840 can handle other operations associated with retirement. For retirement operations here, CTT logic 845 of the retirement unit 840 can store CTT state machine state received with incoming instructions, and feed this information back to the CTT state machine responsive to a misprediction.

FIG. 9A is a block diagram illustrating a micro-architecture for a processor core 900 that can be incorporated into the processor of FIG. 1 or execute the state machine 200 (or CTT processing logic) of FIG. 2. Specifically, processor core 900 depicts an in-order architecture core and a register renaming logic, out-of-order issue/execution logic to be included in a processor according to at least one embodiment of the disclosure. The embodiments of the error correcting code that carry additional bits can be implemented by processor core 900.

The processor core 900 includes a front end unit 930 coupled to an execution engine unit 950, and both are coupled to a memory unit 970. The processor core 900 can include a reduced instruction set computing (RISC) core, a complex instruction set computing (CISC) core, a very long instruction word (VLIW) core, or a hybrid or alternative core type. As yet another option, processor core 900 can include a special-purpose core, such as, for example, a network or communication core, compression engine, graphics core, or the like. In one embodiment, processor core 900 can be a multi-core processor or can be part of a multi-processor system.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (also known as a decoder) can decode instructions, and generate as an output one or more micro-operations, micro-code entry points, microinstructions, other instructions, or other control signals, which are decoded from, or which otherwise reflect, or are derived from, the primary instructions. The decoder 940 can be implemented using various different mechanisms. Examples of suitable mechanisms include, but are not limited to, look-up tables, hardware implementations, programmable logic arrays (PLAs), microcode read only memories (ROMs), etc. The instruction cache unit 934 is further coupled to the memory unit 970. The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations (RS), central instruction window, etc. The scheduler unit(s) 956 can be coupled to the physical register file unit(s) 958. Each of the physical register file unit(s) 958 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 958 can be overlapped by the retirement unit 954 to illustrate various ways in which register renaming and out-of-order execution can be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 can perform various operations (e.g., shifts, addition, subtraction, multiplication) and operate on various types of data (e.g., scalar floating point, packed integer, packed floating point, vector integer, vector floating point).

While some embodiments can include a number of execution units dedicated to specific functions or sets of functions, other embodiments can include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines can be out-of-order issue/execution and the rest in-order.

The set of memory access units 964 can be coupled to the memory unit 970, which can include a data prefetcher 980, a data TLB unit 972, a data cache unit (DCU) 974, and a level 2 (L2) cache unit 976, to name a few examples. In some embodiments DCU 974 is also known as a first level data cache (L1 cache). The DCU 974 can handle multiple outstanding cache misses and continue to service incoming stores and loads. It also supports maintaining cache coherency. The data TLB unit 972 is a cache used to improve virtual address translation speed by mapping virtual and physical address spaces. In one exemplary embodiment, the memory access units 964 can include a load unit, a store address unit, and a store data unit, each of which is coupled to the data TLB unit 972 in the memory unit 970. The L2 cache unit 976 can be coupled to one or more other levels of cache and eventually to a main memory.

In one embodiment, the data prefetcher 980 speculatively loads/prefetches data to the DCU 974 by automatically predicting which data a program is about to consume. Prefetching can refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching can refer to the early retrieval of data from one of the lower level caches/memory to a data cache and/or to prefetch buffer before the processor issues a demand for the specific data being returned.

The processor core 900 can support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core can support multi-threading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming can be used in an in-order architecture. While the illustrated embodiment of the processor also includes a separate instruction and data cache units and a shared L2 cache unit, alternative embodiments can have a single internal cache for both instructions and data, such as, for example, a Level 1 (L1) internal cache, or multiple levels of internal cache. In some embodiments, the system can include a combination of an internal cache and an external cache that is external to the core and/or the processor. Alternatively, all of the cache can be external to the core and/or the processor.

FIG. 9B is a block diagram illustrating an in-order pipeline and a register renaming stage, out-of-order issue/execution pipeline implemented by processor core 900 of FIG. 9A according to some embodiments of the disclosure. The solid lined boxes in FIG. 9B illustrate an in-order pipeline, while the dashed lined boxes illustrates a register renaming, out-of-order issue/execution pipeline. In FIG. 9B, a processor pipeline 990 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924. In some embodiments, the ordering of stages 902-924 can be different than illustrated and are not limited to the specific ordering shown in FIG. 9B.

Figure 10:
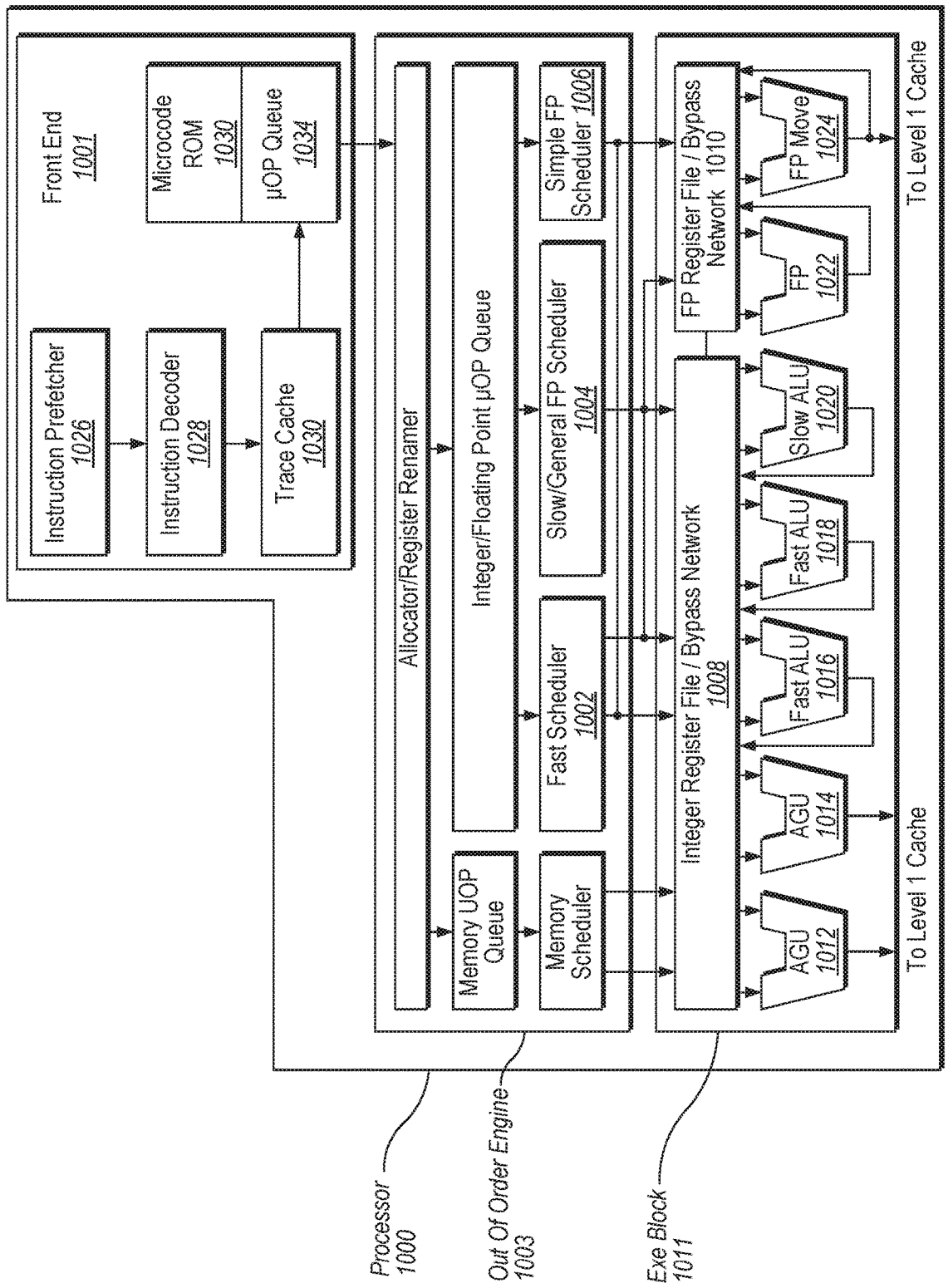
FIG. 10 illustrates a block diagram of the micro-architecture for a processor that, in one embodiment, can represent portions of the processor of FIG. 1.

FIG. 10 illustrates a block diagram of the micro-architecture for a processor 1000 (which can represent the processor of FIG. 1 in one embodiment) that includes logic circuits. In some embodiments, an instruction in accordance with one embodiment can be implemented to operate on data elements having sizes of byte, word, doubleword, quadword, etc., as well as datatypes, such as single and double precision integer and floating point datatypes. In one embodiment, the in-order front end 1001 is the part of the processor 1000 that fetches instructions to be executed and prepares them to be used later in the processor pipeline.

The front end 1001 can include several units. In one embodiment, the instruction prefetcher 1016 fetches instructions from memory and feeds them to an instruction decoder 1018 which in turn decodes or interprets them. For example, in one embodiment, the decoder decodes a received instruction into one or more operations called "micro-instructions" or "micro-operations" (also called micro-op or μops) that the machine can execute. In other embodiments, the decoder parses the instruction into an opcode and corresponding data and control fields that are used by the micro-architecture to perform operations in accordance with one embodiment. In one embodiment, the trace cache 1030 takes decoded μops and assembles them into program ordered sequences or traces in the μop queue 1034 for execution. When the trace cache 1030 encounters a complex instruction, the microcode ROM (or RAM) 1032 can provide the μops needed to complete the operation.

Some instructions are converted into a single micro-op, whereas others need several micro-ops to complete the full operation. In one embodiment, if more than four micro-ops are needed to complete an instruction, the decoder 1018 accesses the microcode ROM 1032 to do the instruction. For one embodiment, an instruction can be decoded into a small number of micro ops for processing at the instruction decoder 1018. In another embodiment, an instruction can be stored within the microcode ROM 1032 should a number of micro-ops be needed to accomplish the operation. The trace cache 1030 refers to an entry point programmable logic array (PLA) to determine a correct micro-instruction pointer for reading the micro-code sequences to complete one or more instructions in accordance with one embodiment from the micro-code ROM 1032. After the microcode ROM 1032 finishes sequencing micro-ops for an instruction, the front end 1001 of the machine resumes fetching micro-ops from the trace cache 1030.

The out-of-order execution engine 1003 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1002, slow/general floating point scheduler 1004, and simple floating point scheduler 1006. The μop schedulers 1002, 1004, 1006, determine when a uop is ready to execute based on the readiness of their dependent input register operand sources and the availability of the execution resources the μops need to complete their operation. The fast scheduler 1002 of one embodiment can schedule on each half of the main clock cycle while the other schedulers can only schedule once per main processor clock cycle. The schedulers arbitrate for the dispatch ports to schedule μops for execution.

Register files 1008, 1010, sit between the schedulers 1002, 1004, 1006, and the execution units 1012, 1014, 1016, 1018, 1020, 1022, 1024 in the execution block 1011. There is a separate register file 1008, 1010, for integer and floating point operations, respectively. Each register file 1008, 1010, of one embodiment also includes a bypass network that can bypass or forward just completed results that have not yet been written into the register file to new dependent μops. The integer register file 1008 and the floating point register file 1010 are also capable of communicating data with the other. For one embodiment, the integer register file 1008 is split into two separate register files, one register file for the low order 32 bits of data and a second register file for the high order 32 bits of data. The floating point register file 1010 of one embodiment has 128 bit wide entries because floating point instructions typically have operands from 64 to 128 bits in width.

The execution block 1011 contains the execution units 1012, 1014, 1016, 1018, 1020, 1022, 1024, where the instructions are actually executed. This section includes the register files 1008, 1010, that store the integer and floating point data operand values that the micro-instructions need to execute. The processor 1000 of one embodiment is comprised of a number of execution units: address generation unit (AGU) 1012, AGU 1014, fast ALU 1016, fast ALU 1018, slow ALU 1020, floating point ALU 1022, floating point move unit 1014. For one embodiment, the floating point execution blocks 1022, 1024, execute floating point, MMX, SIMD, and SSE, or other operations. The floating point ALU 1022 of one embodiment includes a 64-bit-by-64-bit floating point divider to execute divide, square root, and remainder micro-ops. For embodiments of the present disclosure, instructions involving a floating point value can be handled with the floating point hardware.

In one embodiment, the ALU operations go to the high-speed ALU execution units 1016, 1018. The fast ALUs 1016, 1018, of one embodiment can execute fast operations with an effective latency of half a clock cycle. For one embodiment, most complex integer operations go to the slow ALU 1020 as the slow ALU 1020 includes integer execution hardware for long latency type of operations, such as a multiplier, shifts, flag logic, and branch processing. Memory load/store operations are executed by the AGUs 1012, 1014. For one embodiment, the integer ALUs 1016, 1018, 1020, are described in the context of performing integer operations on 64 bit data operands. In alternative embodiments, the ALUs 1016, 1018, 1020, can be implemented to support a variety of data bits including 16, 32, 128, 256, etc. Similarly, the floating point units 1022, 1024, can be implemented to support a range of operands having bits of various widths. For one embodiment, the floating point units 1022, 1024, can operate on 128 bits wide packed data operands in conjunction with SIMD and multimedia instructions.

In one embodiment, the μops schedulers 1002, 1004, 1006, dispatch dependent operations before the parent load has finished executing. As μops are speculatively scheduled and executed in processor 1000, the processor 1000 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1000 also includes logic to implement compression/decompression optimization in solid-state memory devices according to one embodiment. In one embodiment, the execution block 1011 of processor 1000 can include MCU 115, to perform compression/decompression optimization in solid-state memory devices according to the description herein.

The term "registers" can refer to the on-board processor storage locations that are used as part of instructions to identify operands. In other words, registers can be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128-bit wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data can be stored in different registers or the same registers.

Figure 11:
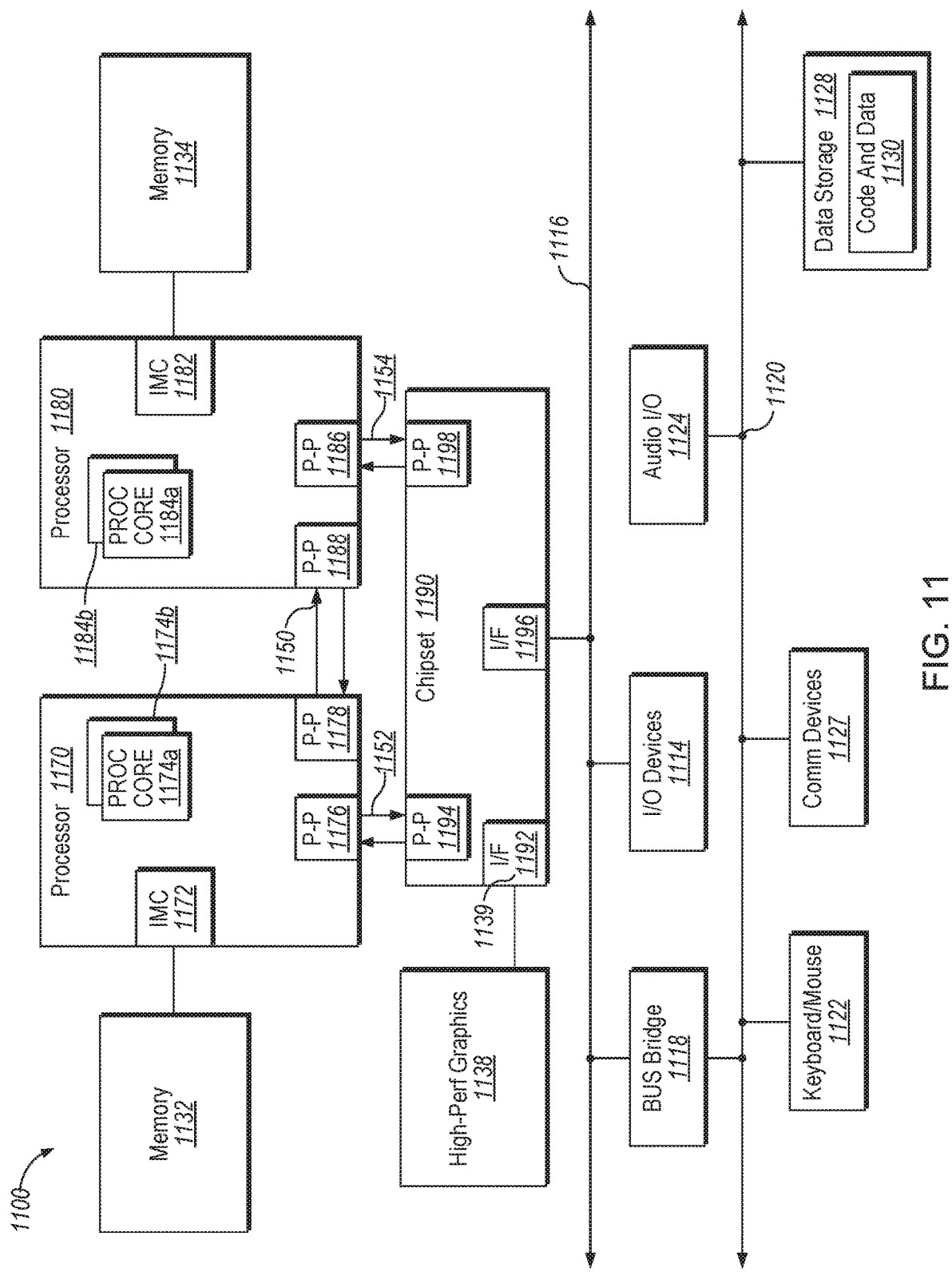
FIG. 11 is a block diagram of a multi-processor system according to one implementation.

Embodiments can be implemented in many different system types. Referring now to FIG. 11, shown is a block diagram of a multiprocessor system 1100 in accordance with an implementation. As shown in FIG. 11, multiprocessor system 1100 is a point-to-point interconnect system, and includes a first processor 1170 and a second processor 1180 coupled via a point-to-point interconnect 1150. As shown in FIG. 11, each of processors 1170 and 1180 can be multicore processors, including first and second processor cores (i.e., processor cores 1174*a* and 1174*b* and processor cores 1184*a* and 1184*b*), although potentially many more cores can be present in the processors. The processors each can include hybrid write mode logics in accordance with an embodiment of the present. The embodiments of the page additions and content copying can be implemented in the processor 1170, processor 1180, or both.

While shown with two processors 1170, 1180, it is to be understood that the scope of the present disclosure is not so limited. In other implementations, one or more additional processors can be present in a given processor.

Processors 1170 and 1180 are shown including integrated memory controller units 1172 and 1182, respectively. Processor 1170 also includes as part of its bus controller units point-to-point (P-P) interfaces 1176 and 1188; similarly, second processor 1180 includes P-P interfaces 1186 and 1188. Processors 1170, 1180 can exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which can be portions of main memory locally attached to the respective processors.

Processors 1170, 1180 can each exchange information with a chipset 1190 via individual P-P interfaces 1152, 1154 using point to point interface circuits 1176, 1194, 1186, 1198. Chipset 1190 can also exchange information with a high-performance graphics circuit 1138 via a high-performance graphics interface 1139.

A shared cache (not shown) can be included in either processor or outside of both processors, yet connected with the processors via P-P interconnect, such that either or both processors' local cache information can be stored in the shared cache if a processor is placed into a low power mode.

Chipset 1190 can be coupled to a first bus 1116 via an interface 1196. In one embodiment, first bus 1116 can be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 can be coupled to first bus 1116, along with a bus bridge 1118 which couples first bus 1116 to a second bus 1120. In one embodiment, second bus 1120 can be a low pin count (LPC) bus. Various devices can be coupled to second bus 1120 including, for example, a keyboard and/or mouse 1122, communication devices 1127 and a storage unit 1128 such as a disk drive or other mass storage device which can include instructions/code and data 1130, in one embodiment. Further, an audio I/O 1124 can be coupled to second bus 1120. Note that other architectures are possible. For example, instead of the point-to-point architecture of FIG. 11, a system can implement a multi-drop bus or other such architecture.

Figure 12:
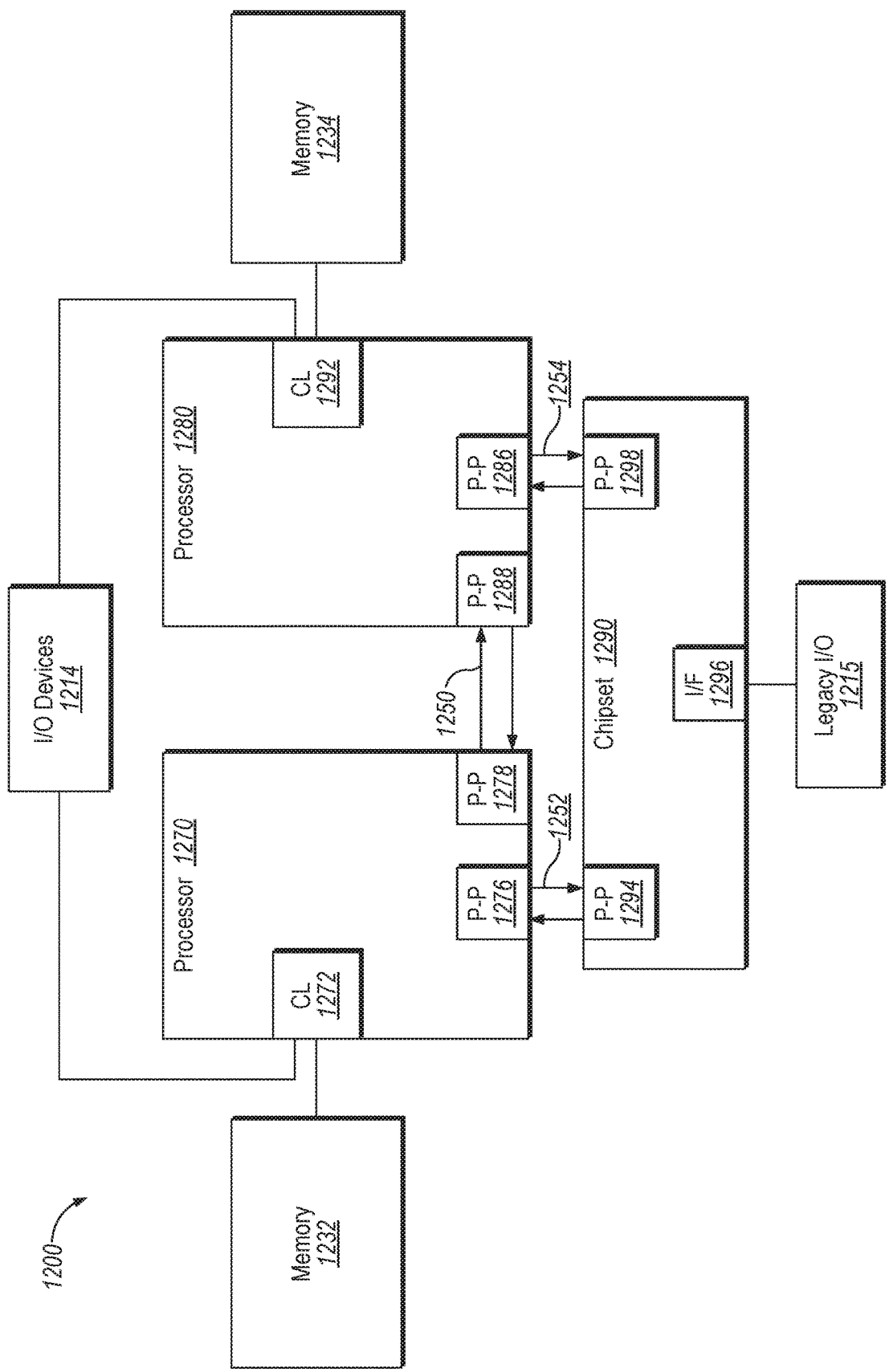
FIG. 12 is a block diagram of a multi-processor system according to another implementation.

Referring now to FIG. 12, shown is a block diagram of a third system 1200 in accordance with an embodiment of the present disclosure. Like elements in FIGS. 11 and 12 bear like reference numerals, and certain aspects of FIG. 11 have been omitted from FIG. 11 in order to avoid obscuring other aspects of FIG. 12.

FIG. 12 illustrates that the processors 1270, 1280 can include integrated memory and I/O control logic ("CL") 1272 and 1282, respectively. For at least one embodiment, the CL 1272, 1282 can include integrated memory controller units such as described herein. In addition. CL 1272, 1282 can also include I/O control logic. FIG. 12 illustrates that the memories 1232, 1234 are coupled to the CL 1272, 1282, and that I/O devices 1214 are also coupled to the control logic 1272, 1282. Legacy I/O devices 1215 are coupled to the chipset 1290. The embodiments of the page additions and content copying can be implemented in processor 1270, processor 1280, or both.

Figure 13:
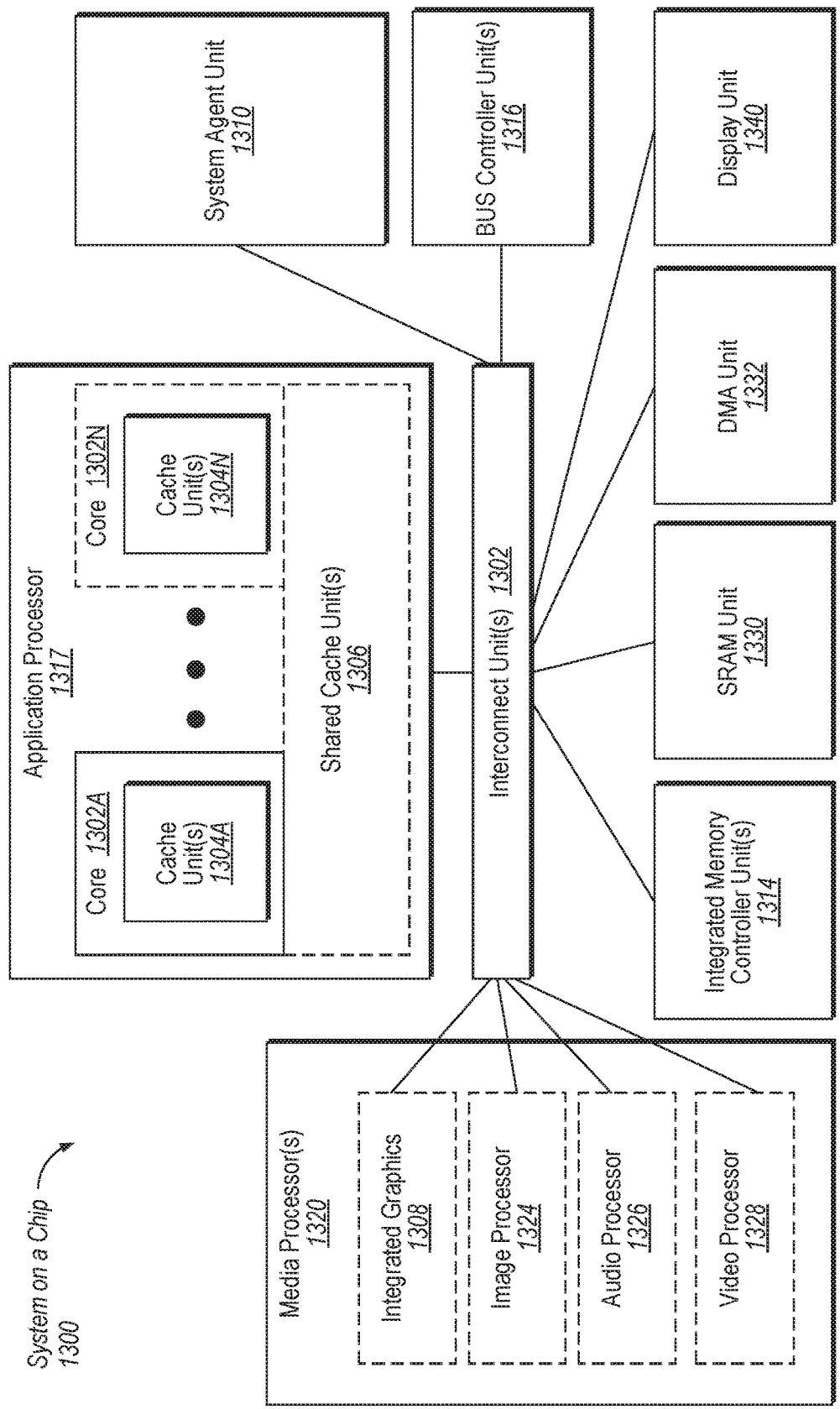
FIG. 13 is a block diagram of a system-on-a-chip according to one implementation.

FIG. 13 is an exemplary system on a chip (SoC) 1300 that can include one or more of the cores 1302. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

With further reference to the SOC 1300, dashed lined boxes are features on more advanced SoCs. In FIG. 13 an interconnect unit(s) 1302 is coupled to: an application processor 1317 which includes a set of one or more cores 1302A-N and shared cache unit(s) 1306; a system agent unit 1310; a bus controller unit(s) 1316; an integrated memory controller unit(s) 1314; a set of one or more media processors 1320 which can include integrated graphics logic 1308, an image processor 1324 for providing still and/or video camera functionality, an audio processor 1326 for providing hardware audio acceleration, and a video processor 1328 for providing video encode/decode acceleration; a static random access memory (SRAM) unit 1330; a direct memory access (DMA) unit 1332; and a display unit 1340 for coupling to one or more external displays. The embodiments of the pages additions and content copying can be implemented in SoC 1300.

Figure 14:
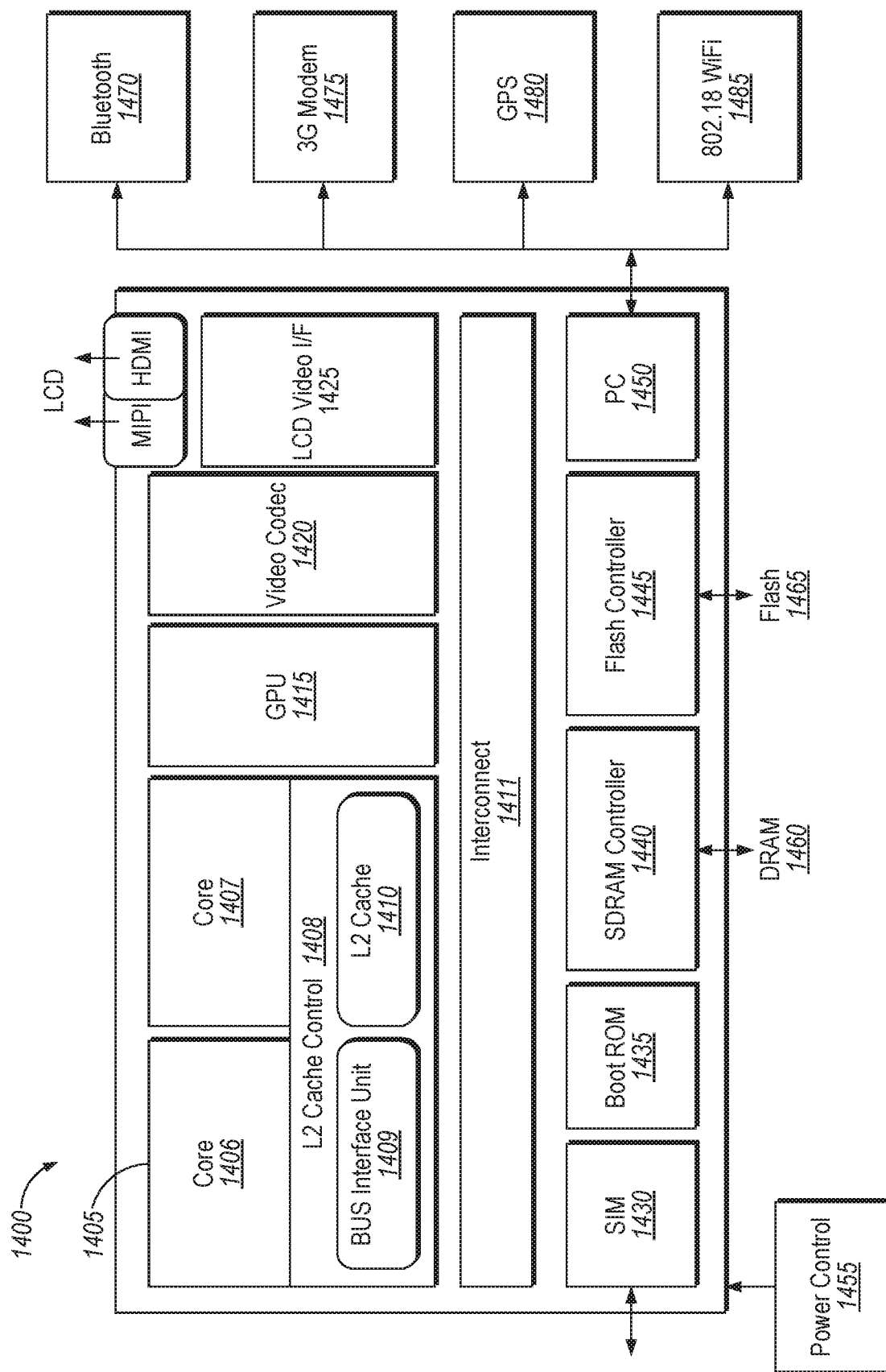
FIG. 14 illustrates another implementation of a block diagram for a computing system.

Turning next to FIG. 14, an embodiment of a system on-chip (SoC) design in accordance with embodiments of the disclosure is depicted. As an illustrative example, SoC 1400 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE can connect to a base station or node, which can correspond in nature to a mobile station (MS) in a GSM network. The embodiments of the page additions and content copying can be implemented in SoC 1400.

Here, SoC 1400 includes 2 cores-1406 and 1407. Similar to the discussion above, cores 1406 and 1407 can conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1406 and 1407 are coupled to cache control 1408 that is associated with bus interface unit 1409 and L2 cache 1410 to communicate with other parts of SOC 1400. Interconnect 1411 includes an on-chip interconnect, such as an IOSF, AMBA, or other interconnects discussed above, which can implement one or more aspects of the described disclosure.

Interconnect 1411 provides communication channels to the other components, such as a Subscriber Identity Module (SIM) 1430 to interface with a SIM card, a boot ROM 1435 to hold boot code for execution by cores 1406 and 1407 to initialize and boot SoC 1400, a SDRAM controller 1440 to interface with external memory (e.g., DRAM 1460), a flash controller 1445 to interface with non-volatile memory (e.g., Flash 1465), a peripheral control 1450 (e.g. Serial Peripheral Interface) to interface with peripherals, video codecs 1420 and Video interface 1425 to display and receive input (e.g. touch enabled input), GPU 1415 to perform graphics related computations, etc. Any of these interfaces can incorporate aspects of the embodiments described herein.

In addition, the system illustrates peripherals for communication, such as a Bluetooth module 1470, 3G modem 1475, GPS 1480, and Wi-Fi 1485. Note as stated above, a UE includes a radio for communication. As a result, these peripheral communication modules can not all be included. However, in a UE some form of a radio for external communication should be included.

Figure 15:
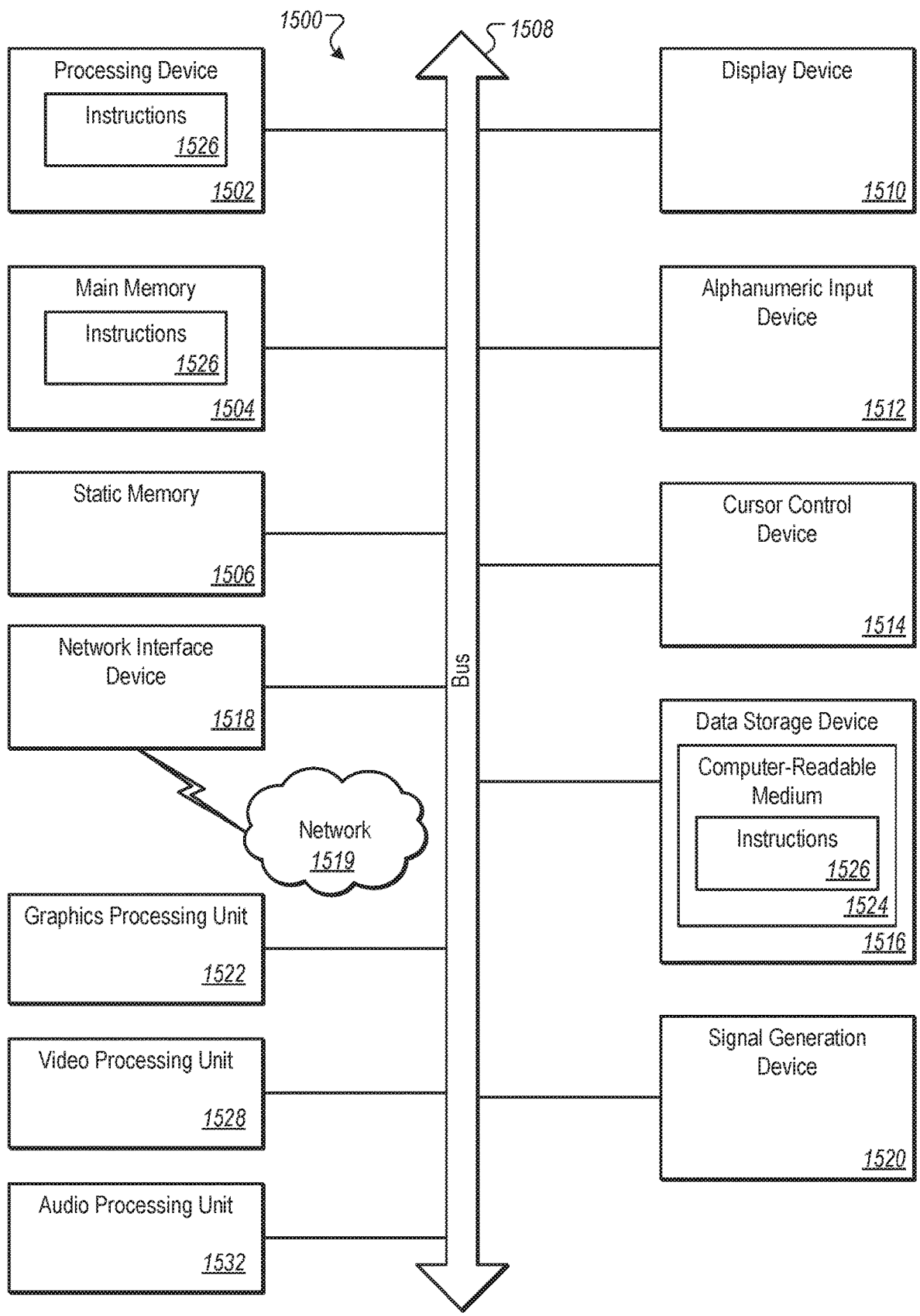
FIG. 15 illustrates another implementation of a block diagram for a computing system.

FIG. 15 illustrates a diagrammatic representation of a machine in the example form of a computing system 1500 within which a set of instructions, for causing the machine to perform any one or more of the methodologies discussed herein, can be executed. In alternative embodiments, the machine can be connected (e.g., networked) to other machines in a LAN, an intranet, an extranet, or the Internet. The machine can operate in the capacity of a server or a client device in a client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments that execute the processor of FIG. 1 can be implemented in or as a part of the computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device can be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 can also be one or more special-purpose processing devices such as an application specific integrated circuit (ASIC), a field programmable gate array (FPGA), a digital signal processor (DSP), network processor, or the like. In one embodiment, processing device 1502 can include one or processor cores. The processing device 1502 is configured to execute the processing logic or instructions 1526 for performing the operations discussed herein.

In one embodiment, processing device 1502 can be the processor of FIG. 1. Alternatively, the computing system 1500 can include other components as described herein. It should be understood that the core can support multithreading (executing two or more parallel sets of operations or threads), and can do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 can further include a network interface device 1518 communicably coupled to a network 1519. The computing system 1500 also can include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 can include a graphics processing unit 1522, a video processing unit 1528 and an audio processing unit 1532. In another embodiment, the computing system 1500 can include a chipset (not illustrated), which refers to a group of integrated circuits, or chips, that are designed to work with the processing device 1502 and controls communications between the processing device 1502 and external devices. For example, the chipset can be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 can include a computer-readable storage medium 1524 on which is stored software 1526 embodying any one or more of the methodologies of functions described herein. The software 1526 can also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 can also be used to store instructions 1526 utilizing the processing device 1502, such as described with respect to FIGS. 1-4, and/or a software library containing methods that call the above applications. While the computer-readable storage medium 1524 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) an execution unit; and 2) a processing logic operatively coupled to the execution unit, the processing logic to: a) enter a first execution state; b) transition to a second execution state responsive to executing a control transfer instruction; c) responsive to executing a target instruction of the control transfer instruction: i) transition to the first execution state responsive to the target instruction being a control transfer termination instruction of a mode identical to a mode of the processing logic following the execution of the control transfer instruction; and ii) raise an execution exception responsive to the target instruction being a control transfer termination instruction of a mode different than the mode of the processing logic following the execution of the control transfer instruction.

In Example 2, the processor of Example 1, wherein the target instruction is a 32-bit instruction and the mode of the processing logic following the control transfer instruction is 64-bit.

In Example 3, the processor of Example 1, wherein the target instruction is a 64-bit instruction and the mode of the processing logic following the control transfer instruction is 32-bit.

In Example 4, the processor of Example 1, wherein the control transfer instruction is an indirect call or jump instruction and the control transfer termination instruction is an ENDBRANCH instruction.

In Example 5, the processor of Example 1, wherein the control transfer instruction is a return instruction and the control transfer termination instruction is an ENDRET instruction.

In Example 6, the processor of Example 1, wherein the control transfer termination instruction is a mode-specific, multi-byte opcode executable as a no operation.

In Example 7, the processor of Example 1, wherein the first execution state comprises an IDLE state and wherein the second execution state comprises a WAIT state.

Various embodiments can have different combinations of the structural features described above. For instance, all optional features of the computing system described above can also be implemented with respect to the method or process described herein and specifics in the examples can be used anywhere in one or more embodiments.

Example 8 is a processor comprising: 1) a decode unit to decode instructions according to a first mode or a second mode depending on a mode of the instructions, 2) wherein the decode unit includes a processing logic to raise an execution exception responsive to a next instruction, decoded after a control transfer instruction, being a control transfer termination instruction of the second mode when the mode of the processing logic following the execution of the control transfer instruction is of the first mode, wherein the control transfer termination instruction is a mode-specific, multi-byte opcode executable as a no operation.

In Example 9, the processor of Example 8, wherein the first mode is 32-bit the second mode is 64-bit.

In Example 10, the processor of Example 8, wherein the first mode is 64-bit the second mode is 32-bit.

In Example 11, the processor of Example 8, wherein the control transfer instruction is an indirect call or jump instruction and the control transfer termination instruction is an ENDBRANCH instruction.

In Example 12, the processor of Example 8, wherein the control transfer instruction is a return instruction and the control transfer termination instruction is an ENDRET instruction.

In Example 13, the processor of Example 8, further comprising 1) an execution pipeline, wherein the decode unit is further to: a) decode the control transfer instruction into a micro-operation; b) generate a fault micro-operation responsive to detecting a conflict in mode between the control transfer termination instruction and the mode of the processing logic following execution of the control transfer instruction; and c) feed the micro-operation and the fault micro-operation into the execution pipeline.

Various embodiments can have different combinations of the structural features described above. For instance, all optional features of the computing system described above can also be implemented with respect to the method or process described herein and specifics in the examples can be used anywhere in one or more embodiments.

Example 14 is a system comprising: 1) a fetch unit to fetch instructions of a first mode and a second mode; 2) a decode unit to decode the instructions, the decode unit further to, responsive to a control transfer instruction, decode the control transfer instruction into a first micro-operation; 3) an execution unit operatively coupled to the decode unit and to execute micro-operations from decoded instructions; and 4) a retirement unit to retire the first micro-operation, the retirement unit including processing logic to raise an execution exception when a next micro-instruction to be retired after the first micro-operation is a control transfer termination micro-instruction of the second mode when the mode of the processing logic following execution of the first micro-operation is of the first mode.

In Example 15, the system of Example 14, wherein the control transfer termination micro-instruction is generated from a mode-specific, multi-byte opcode executable as a no operation.

In Example 16, the system of Example 14, wherein the first mode is 32-bit the second mode is 64-bit.

In Example 17, the system of Example 14, wherein the first mode is 64-bit the second mode is 32-bit.

In Example 18, the system of Example 14, wherein the processing logic is further to associate a first state with the first micro-operation decoded from the control transfer instruction to indicate that the processing logic is in a WAIT state.

In Example 19, the system of Example 18, wherein the decode unit is further to associate a second state with a second micro-operation decoded from a second control transfer instruction that is followed by a control transfer termination instruction of the same mode as the mode of the processing logic following execution of second control transfer instruction, wherein the second state is to indicate that the processing logic is in an IDLE state.

In Example 20, the system of Example 14, wherein the retirement unit is further to communicate a last retired micro-instruction and a last state of the processing logic associated with the last retired micro-instruction to the decode unit responsive to a misprediction, and wherein the decode unit is further to update a state of the processing logic in view of the last state.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to compression/decompression optimization in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. An apparatus comprising:
    decoder circuitry to decode a first single instruction, the first single instruction to include an opcode to indicate execution of an indirect branch in 64-bit mode is to be terminated; and
    a hardware tracker coupled to the decoder circuitry, the hardware tracker to, in response to the decoder decoding the first single instruction in 64-bit mode, terminate a 64-bit indirect branch and set a tracker state to idle and a suppress indication field to not suppressed, and, in response to the decoder decoding the first single instruction in 32-bit mode, raise an execution exception,
    wherein the decoder circuitry is to decode a second single instruction, the second single instruction to include an opcode to indicate execution of an indirect branch in 32-bit mode is to be terminated and the hardware tracker coupled to the decoder circuitry, the hardware tracker is to terminate a 32-bit indirect branch and set the tracker state to idle and a suppress indication field to not suppressed.

2. The apparatus of claim 1, wherein the hardware tracker is to include separate trackers for user mode and supervisor mode.

3. The apparatus of claim 1, further comprising a register to store an indication of whether the first single instruction is supported.

4. The apparatus of claim 3, wherein the first single instruction is to be considered a no-op when the register indicates that the first single instruction is not supported.

5. A system comprising:
    memory to store a plurality of instructions; and
    a processor coupled to the memory, the processor including:
        decoder circuitry to decode a first single instruction of the plurality of instructions, the first single instruction to include an opcode to indicate execution of an indirect branch in 64-bit mode is to be terminated; and
        a hardware tracker coupled to the decoder circuitry, the hardware tracker to, in response to the decoder decoding the first single instruction in 64-bit mode, terminate a 64-bit indirect branch and set a tracker state to idle and a suppress indication field to not suppressed, and, in response to the decoder decoding the first single instruction in 32-bit mode, raise an execution exception,
    wherein the decoder circuitry is to decode a second single instruction of the plurality of instructions, the second single instruction to include an opcode to indicate execution of an indirect branch in 32-bit mode is to be terminated and the hardware tracker coupled to the decoder circuitry, the hardware tracker is to terminate a 32-bit indirect branch and set a tracker state to idle and a suppress indication field to not suppressed.

6. The system of claim 5, wherein the hardware tracker is to include separate trackers for user and supervisor modes.

7. The system of claim 5, further comprising a register to store an indication of whether the first single instruction is supported.

8. The system of claim 7, wherein the first single instruction is to be considered a no-op when the register indicates that the first single instruction is not supported.

9. A method comprising:
    decoding a first single instruction, the first single instruction to include an opcode to indicate execution of an indirect branch in 64-bit mode is to be terminated; and
    in response to the decoded first single instruction in 64-bit mode,
        terminating a 64-bit indirect branch,
        setting a tracker state to idle, and
        setting a suppress indication field to not suppressed; and
    in response to the decoded first single instruction in 32-bit mode, raising an execution exception,
    wherein decoding a second single instruction, the first second single instruction to include an opcode to indicate execution of an indirect branch in 32-bit mode is to be terminated; and in response to the decoded second single instruction, terminating a 32-bit indirect branch, setting a tracker state to idle, and setting a suppress indication field to not suppressed.

10. The method of claim 9, wherein separate trackers are utilized for user mode and supervisor mode.

11. The method of claim 9, further comprising storing, in a register, an indication of whether the first single instruction is supported.

12. The method of claim 9, wherein the first single instruction is to be considered a no-op when the register indicates that the first single instruction is not supported.

* * * * *